United States Patent
Gal et al.

(10) Patent No.: US 12,313,730 B2
(45) Date of Patent: May 27, 2025

(54) SYSTEMS AND METHODS FOR IMAGING CONCEALED SURFACES

(71) Applicant: VAYYAR IMAGING LTD., Yehud (IL)

(72) Inventors: Omer Gal, Tel Aviv (IL); Assaf Kartowsky, Tel Aviv (IL); Shay Moshe, Petach Tikva (IL); Iddo Bar-David, Talmei Elazar (IL); Eyal Koren, Rehovot (IL); Noam Sol Yarkoni, Ramat Gan (IL); Tanya Chernyakova, Tel Aviv (IL)

(*) Notice: Subject to any disclaimer, the term of this patent is extended or adjusted under 35 U.S.C. 154(b) by 558 days.

(21) Appl. No.: 17/764,213

(22) PCT Filed: Sep. 29, 2020

(86) PCT No.: PCT/IB2020/059106
§ 371 (c)(1),
(2) Date: Mar. 28, 2022

(87) PCT Pub. No.: WO2021/059254
PCT Pub. Date: Apr. 1, 2021

(65) Prior Publication Data
US 2022/0365205 A1    Nov. 17, 2022

Related U.S. Application Data

(60) Provisional application No. 63/078,336, filed on Sep. 15, 2020, provisional application No. 62/955,482, filed on Dec. 31, 2019, provisional application No. 62/948,337, filed on Dec. 16, 2019, provisional application No. 62/907,655, filed on Sep. 29, 2019.

(51) Int. Cl.
*G01S 13/88* (2006.01)
*G01S 13/89* (2006.01)

(52) U.S. Cl.
CPC ............ *G01S 13/887* (2013.01); *G01S 13/89* (2013.01)

(58) Field of Classification Search
CPC .................................................... G01S 13/887
See application file for complete search history.

(56) References Cited

U.S. PATENT DOCUMENTS

| | | | |
|---|---|---|---|
| 3,971,983 A | 7/1976 | Jaquet | |
| 9,417,356 B2* | 8/2016 | Chen | G01V 8/20 |
| 10,162,050 B2* | 12/2018 | Chekroun | H01Q 13/18 |
| 11,313,963 B2* | 4/2022 | Qi | G01V 9/00 |
| 11,423,677 B2* | 8/2022 | Ozkucur | G06F 18/22 |
| 2003/0035105 A1* | 2/2003 | Quist | G01N 15/14 |
| | | | 356/338 |
| 2004/0012398 A1 | 1/2004 | Bailey et al. | |
| 2005/0058021 A1 | 3/2005 | Feintuch et al. | |
| 2006/0170591 A1 | 8/2006 | Houri | |

(Continued)

*Primary Examiner* — Vladimir Magloire
*Assistant Examiner* — Eric K Hodac
(74) *Attorney, Agent, or Firm* — AlphaPatent Associates Ltd.; Daniel J. Swirsky

(57) ABSTRACT

Radar systems and methods for imaging concealed surfaces. A processor receives raw data from the radar and executes an image data generation. A display unit displays an image representing the concealed surface. The radar unit may be incorporated in a handheld scanner, a walkthough scanner, an underfoot scanner, an overhead scanner or the like. Dimensions of the scanning unit may be selected to enable a full body scan of a subject.

19 Claims, 18 Drawing Sheets

(56) References Cited

U.S. PATENT DOCUMENTS

| | | |
|---|---|---|
| 2006/0195219 A1 | 8/2006 | Luhnow et al. |
| 2007/0228280 A1 | 10/2007 | Mueller |
| 2007/0263907 A1 | 11/2007 | McMakin et al. |
| 2010/0220001 A1* | 9/2010 | Longstaff ............... H01Q 1/007 |
| | | 342/201 |
| 2011/0129063 A1 | 6/2011 | Bendahan |
| 2015/0025788 A1 | 1/2015 | Crain et al. |
| 2015/0253422 A1 | 9/2015 | Morton et al. |
| 2015/0293221 A1 | 10/2015 | Ahmed |
| 2017/0238835 A1 | 8/2017 | Melamed |
| 2021/0090301 A1* | 3/2021 | Mammou ................. G06T 7/11 |

* cited by examiner

SYSTEMS AND METHODS FOR IMAGING CONCEALED SURFACES

CROSS-REFERENCE TO RELATED APPLICATIONS

This application is a U.S. National Phase Application under 35 U.S.C. 371 of International Application No. PCT/IB2020/059106, which has an international filing date of Sep. 29, 2020, which claims the benefit of priority from U.S. Provisional Patent Application No. 62/907,655, filed Sep. 29, 2019, U.S. Provisional Patent Application No. 62/948,337, filed Dec. 16, 2019, U.S. Provisional Patent Application No. 62/955,482, filed Dec. 31, 2019, and U.S. Provisional Patent Application No. 63/078,336, filed Sep. 15, 2020, the contents of which are incorporated by reference in their entirety.

FIELD OF THE DISCLOSURE

The disclosure herein relates to systems and methods for radar imaging of surfaces. In particular, but not exclusively, the disclosure relates to imaging concealed surfaces covered by outer layers.

BACKGROUND

Object scanning, such as security scanning, is commonly carried out using a metal detector which is capable of detecting the presence of metallic objects concealed beneath clothing, within packages or other opaque outer layers. Metal detectors are convenient as they may be mounted in frames or handheld scanning devices. However metal detectors only detect metallic objects, furthermore they do not typically provide imaging data to indicate the shape or nature of the object detected.

Various imaging methods are known, such as x-ray devices which may be used to image objects concealed behind opaque outer layers. X-rays of various energy levels may be used to detect various types of objects. However, x-rays are harmful to health and x-ray devices are large and unwieldy. Consequently, x-rays devices are not suitable for handheld scanners.

Full body scanners typically require a scanner to be rotated about the scanned subject so as to expose the whole of the surface of the subject to scanning radiation. Alternatively, the subject may rotated relative to the scanner. This can be time consuming and cumbersome. Practically this may limit the number of subjects that may be scanned particularly in security situations such as airports and the like where large numbers of subjects.

SUMMARY OF THE EMBODIMENTS

There is a long established need for efficient scanning systems and methods which may be used for imaging concealed objects. The disclosure herein addresses this need.

According to one aspect of the presently disclosed subject matter, a system is introduced for imaging a concealed surface covered by an opaque outer layer. The scanning system includes a radar unit a processor unit, a memory unit, and a display.

The radar unit may comprise at least one transmitter antenna connected to an oscillator and configured to transmit electromagnetic waves through the opaque outer layer towards the concealed surface, and at least one receiver antenna configured to receive electromagnetic waves reflected by the concealed surface and operable to generate raw data. The processor unit may be configured to receive raw data from the radar unit and operable to generate image data based upon the received data. The memory unit may be configured and operable to store the image data. The display may be configured and operable to display an image representing the concealed surface.

Where appropriate, the radar unit may be encased within a movable casing unit. Accordingly, a registration mechanism configured and operable to record the scanning device's own location thereby providing a reference position for antennas transmitting signals are receiving reflected signals are received. The registration mechanism may comprise a set of fixed reference beacons. Accordingly, the processor unit may be operable to triangulate the location of the radar unit.

Where appropriate, the scanning device of may be incorporated into a security scanner operable to detect concealed weapons. In some cases, the movable casing unit has dimensions suitable for use as a hand-held scanner. Additionally or alternatively, the scanning device may further comprise a metal detection unit.

Variously, the radar unit may be incorporated into a tablet computer.

Optionally, the scanning device of may be incorporated into a clothes fitting device operable to measure dimensions of a body.

Additionally or alternatively, the scanning device may be operable to image the contents of a closed package. For example, the scanning device of may be operable to image the contents of a package. Coffin, sarcophagus, etc . . . .

Where appropriate, the scanning device may be incorporated into an underfoot unit configured and operable to scan a shoe of a subject to image surfaces of objects concealed therewithin.

In other examples a full body scanning system is introduced in which a radar unit may comprise: a corridor configured to allow a subject to pass along an unobstructed path; a first array of electromagnetic transceivers along one a first side of the corridor; a second array of electromagnetic transceivers along a second side of the corridor facing the second array; wherein the corridor has dimensions selected such that, as the subject passes along the unobstructed path, for any surface-section of the subject, there is a position along the path at which electromagnetic radiation transmitted from at least one transmitter of the radar unit and reflected by the surface-section is received by at least one receiver of the radar unit.

In particular scanning devices the corridor is bounded by a first wall and a second wall facing the first wall and parallel thereto. Accordingly, the radar unit may comprise a first planar array of electromagnetic transceiver units incorporated into the first wall, and a second planar array of electromagnetic transceiver units incorporated into the second wall; and the unobstructed path follows a straight line parallel to the first wall and the second wall.

Optionally, the corridor has a corridor-width dx, the first wall and the second wall share a wall-length dy, and the unobstructed path runs at a path-distance x0 from the first wall; and the corridor-width dx and the wall-length dy are selected such that:

$$\frac{1}{2}\left[180 - \arctan\left(\frac{dy}{dx - x_0}\right)\right]$$

is less than or equal to and $$\arctan\left(\frac{dy}{x_0}\right),$$

and $$\frac{1}{2}\left[180 - \arctan\left(\frac{dy}{x_0}\right)\right]$$

is greater than or equal to $$180 - \arctan\left(\frac{dy}{dx - x_0}\right).$$

Where the transceiver units have a field-of-view of 180-phi, the path-distance x0 may be selected such that:

$$\left[90 - \arctan\left(\frac{dy}{x_0}\right)\right] > phi$$

$$\left[90 - \arctan\left(\frac{dy}{dx - x_0}\right)\right] > phi.$$

Optionally again, the corridor has a corridor-width dx; the first wall and the second wall share a wall-length dy; the corridor has a margin of margin-width dw from each wall; and the unobstructed path runs at a path-distance x0 from the first wall; and x0 lies within the range dw and (dx-dw).

Variously, the electromagnetic transceivers comprise at least one phase array transmitter. Additionally or alternatively, electromagnetic transceivers may comprise at least one phase array receiver configured perpendicular to the phase array transmitter. Optionally, the scanning device may also includes a control chip.

Where appropriate, the radar unit comprises a plurality of rows of electromagnetic transceivers arranged vertically.

According to another aspect of the presently disclosed subject matter, a method is hereby taught for for imaging a concealed surface covered by an opaque outer layer. The method may include steps such as: providing a radar unit comprising at least one transmitter antenna connected to an oscillator and at least one receiver antenna; providing a processor unit; transmitting electromagnetic waves through the opaque outer layer towards the concealed surface; receiving electromagnetic waves reflected by the concealed surface; transferring raw data to the processor; generating image data based upon raw data received from the radar unit; storing the image data in a memory unit; and adjusting a display device to represent the concealed surface on a display.

Optionally, the method may further include a step of recording the scanning device's own location thereby providing a reference position for antennas transmitting signals are receiving reflected signals are received. For example, the method may further include a step of triangulating the location of the radar unit.

Where appropriate, the method may further include steps of: providing a radar unit comprising at least one transmitter antenna connected to an oscillator and at least one receiver antenna; providing a movable casing unit encasing the radar unit; passing the movable casing over the concealed surface.

A further method is taught for performing a full body scan of an individual by: selecting scanning arrangement dimensions such that as a subject passes along an unobstructed path, for any surface-section of the subject, there is a position along the path at which electromagnetic radiation transmitted from at least one transmitter of the scanning arrangement and reflected by the surface-section is received by at least one receiver of the scanning arrangement. Accordingly, further steps may include: providing a corridor configured to allow the subject to pass along the unobstructed path; providing a first array of electromagnetic transceivers along one a first side of the corridor; providing a second array of electromagnetic transceivers along a second side of the corridor facing the second array; transmitting electromagnetic waves towards subjects passing through the corridor; receiving electromagnetic waves reflected by subjects passing through the corridor; transferring raw data to a processor; generating image data based upon raw data received from the radar unit; storing the image data in a memory unit; and adjusting a display device to represent the concealed surface on a display.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DETAILED DESCRIPTION

Figure 1A:
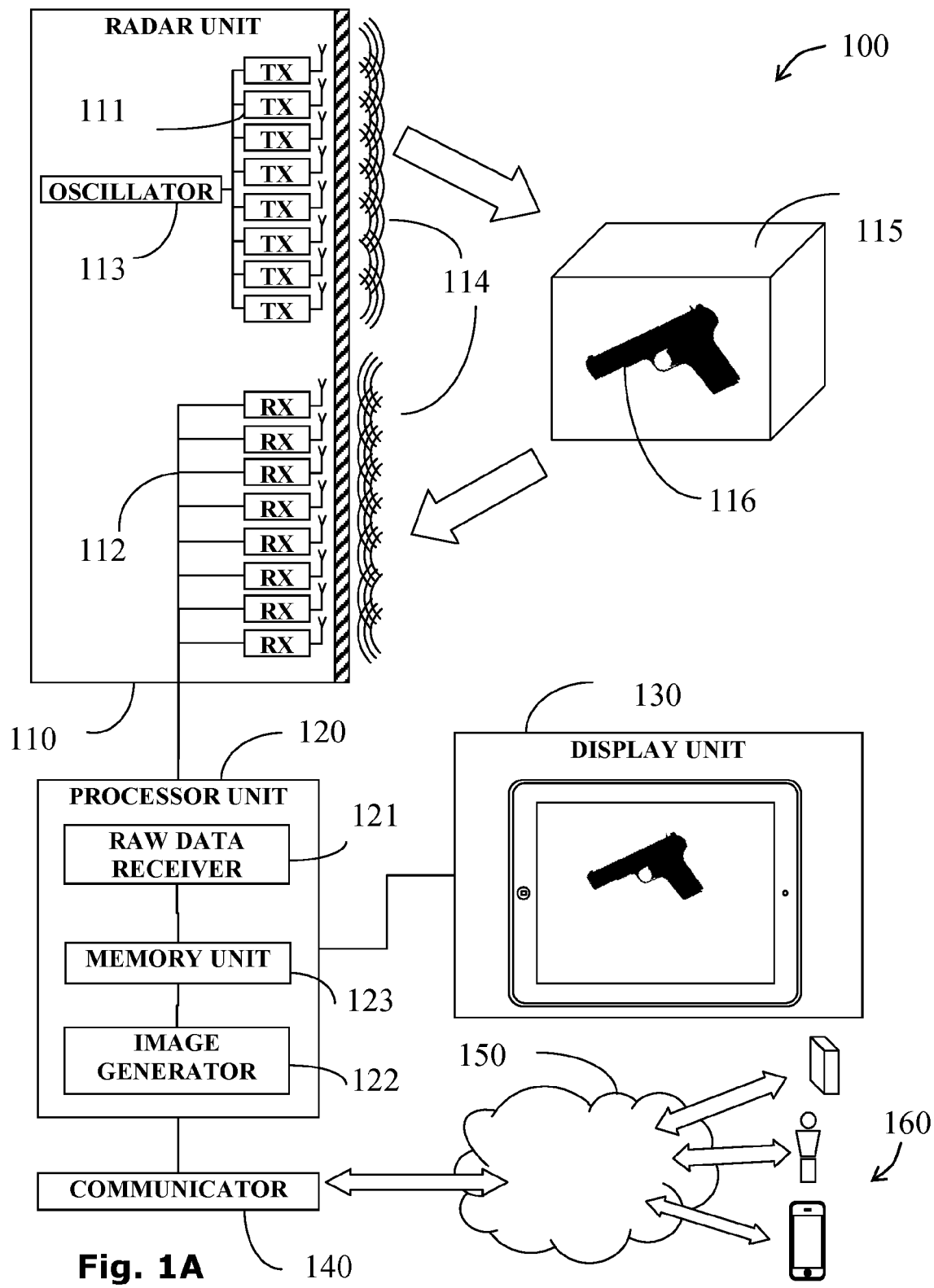
FIG. 1A schematically represents elements of a system for imaging a concealed surface covered by an opaque outer layer.
Figure 1B:
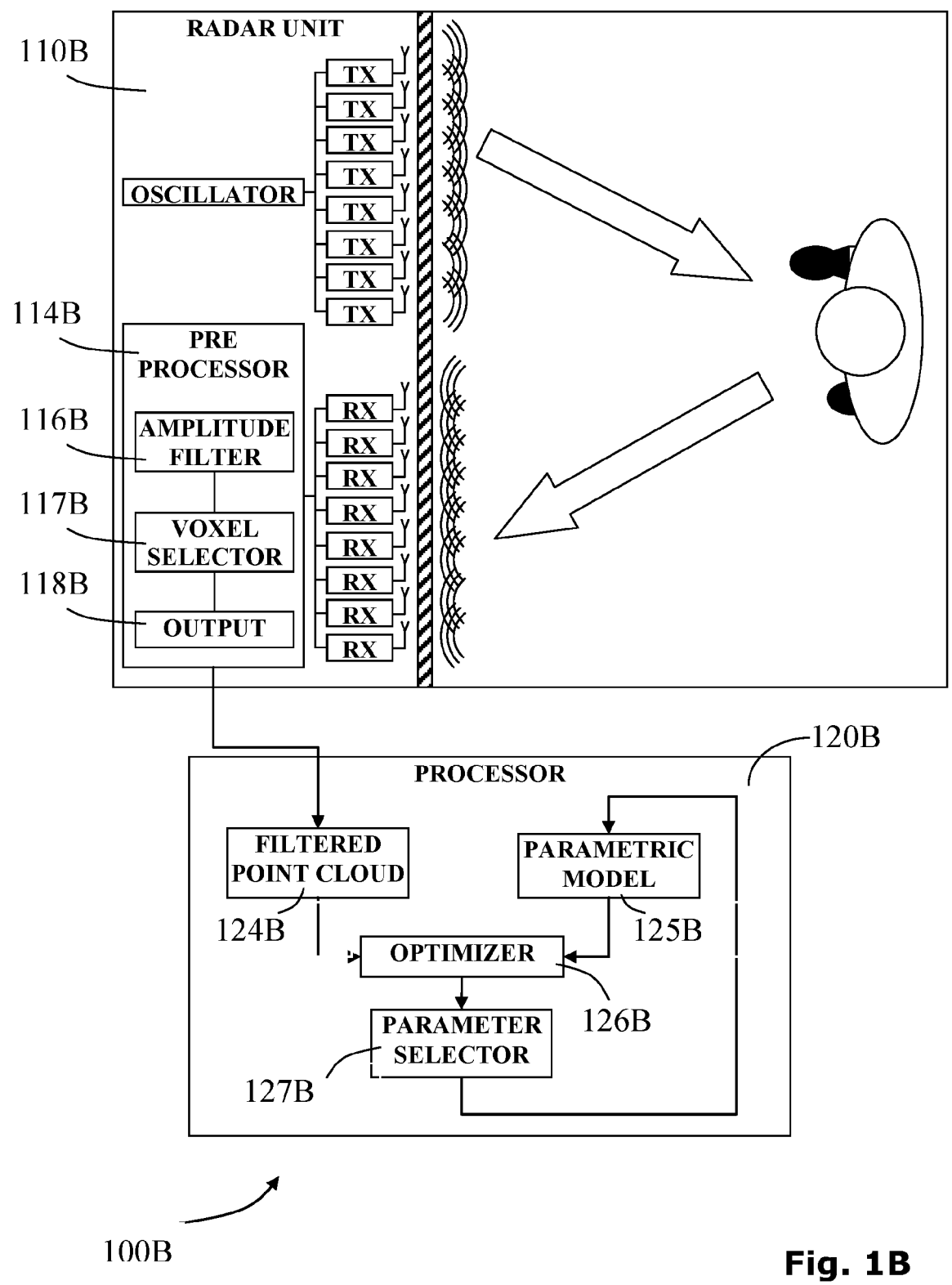
FIG. 1B is a schematic block diagram indicating selected components of a radar based body scanning system of the disclosure.

Aspects of the present disclosure relate to systems and methods for scanning subjects, particularly for radar imaging of concealed surfaces covered by an opaque outer layer. Radar imaging devices may be used in a variety of applications where an outer layer obscures an image.

In one example of a homeland security application it is often necessary to scan individuals to make sure that they do not carry concealed weapons so as to provide security clearance. Similarly it may be useful to scan packages to ascertain the contents thereof represent a security threat.

In another application, clothes fitters may use a radar device to measure the body shape and dimensions of a clothed individual. If is particularly noted that radar imaging is particularly useful in the case of body imaging as, although images may be generated and measurements may be taken, the resolution of the generated images is not typically high enough to impinge upon an individuals privacy.

Still other applications may include scientific investigations, mining, tunnel detection, prospecting, archeology and the like. It is particularly noted that the imaging of archeological artifacts such as mummies, coffins and sarcophagi often requires large and costly medical equipment such as CT scanners and MRI units. A convenient portable radar imager may allow for faster and more convenient analysis of archeological artifacts in situ.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Reference is now made to FIG. 1A which schematically represents various elements of a system for imaging a concealed surface covered by an opaque outer layer 100 according to the current disclosure.

The scanning device includes a radar unit 110, a processor 120, a display unit 130 and a communicator 140. The radar unit 110 includes at least one transmitter antenna 111 and at least one receiver antenna 112. The transmitter 111 is connected to an oscillator 113 and configured to transmit electromagnetic waves 114 through the opaque outer layer 115 towards the concealed surface 116 therebehind. The receiver 112 is configured to receive electromagnetic waves 114 reflected by the concealed surface 116 and is operable to generate raw data.

The processor unit 120 is includes a receiver 121 configured to receive raw data from the radar unit 110 and operable to execute an image data generation function to generate image data based upon the received data. A memory unit 123 is provided to store the image data thus generated and an image generator 122 may be operable to convert the image data into a displayable image. Accordingly, the display unit 130 is configured and operable to present an array of pixels displaying an image representing the concealed surface 116.

The radar 110 typically includes at least one array of radio frequency transmitter antennas 111 and at least one array of radio frequency receiver antennas 112. The radio frequency transmitter antennas 111 are connected to an oscillator 113 (radio frequency signal source) and are configured and operable to transmit electromagnetic waves 114 towards the target region. The radio frequency receiver antennas 112 are configured to receive electromagnetic waves 114 reflected back from objects within the target region.

Accordingly the transmitter 111 may be configured to produce a beam of electromagnetic radiation 114, such as microwave radiation or the like, directed towards a monitored region such as an enclosed room or the like. The receiver may include at least one receiving antenna or array of receiver antennas 112 configured and operable to receive electromagnetic waves reflected by objects within the monitored region. In order for the concealed inner layer 116 to be rendered visible, it is a particular feature of the current disclosure that the frequency of transmitted radiation is selected such that the outer layer 115 is transparent to the transmitted radiation and the reflected radiation which pass therethrough.

The raw data generated by the receivers 112 is typically a set of magnitude and phase measurements corresponding to the waves scattered back from the objects in front of the array. Spatial reconstruction processing is applied to the measurements to reconstruct the amplitude (scattering strength) at the three dimensional coordinates of interest within the target region. Thus each three dimensional section of the volume within the target region may represented by a voxel defined by four values corresponding to an x-coordinate, a y-coordinate, a z-coordinate, and an amplitude value.

The communication module 140 is configured and operable to communicate information to third parties 160. Optionally the communication module 140 may be in communication with a computer network such as the internet 150 via which it may communicate alerts to third parties for example via telephones, computers, wearable devices or the like 160.

Referring now to FIG. 1A, a schematic block diagram indicates selected components of a radar based body scanning embodiment of the system 100B. The radar based body scanning system 100B includes a radar unit 110B, and a processor 120B.

The radar unit 110B of the body scanning embodiment may be mounted to a wall for example behind an optical mirror transparent to radio waves, embedded in the frame of a mirror, or the like where it may scan a target region in front of the wall.

Typically the receivers are connected to a pre-processing unit 114B configured and operable to process the amplitude matrix of raw data generated by the receivers and produce a filtered point cloud suitable for model optimization.

Accordingly, where appropriate, a preprocessing unit 114B may include an amplitude filter 116B operable to select voxels having amplitude above a required threshold and a voxel selector 117B operable to reduce the number of voxels in the filtered data, for example by sampling the data or clustering neighboring voxels. In this manner the filtered point cloud may be output 118B to a processor 120B. It is further note that the filtered point cloud may further be simplified by setting the amplitude value of each voxel to ONE when the amplitude is above the threshold and to ZERO when the amplitude is below the threshold.

The processor 120B which is in communication with the output 118B of the preprocessor unit 114B is operable to receive the filtered point cloud 124B from the output of the preprocessor 114B and to compare the filtered point cloud with a human parametric model 125B stored in a memory unit.

The parametric model 125B may be generated by averaging scans of multiple subjects and/or applying machine learning to such scans and stored in the memory unit of the processor or remotely. The parametric model may be represented as a model function which receives a set of values representing model parameters and returns as set of voxels which model the subject.

By way of example, parameters may be selected from various measurable values of a subject, for example for a human subject parameters such as gender, height, weight, waist size, inner-thigh, inseam, arm-span, hand span, wrist to shoulder length, shoe size and the like as well as combinations thereof may generate candidate models with characteristic voxel sets. In some examples, separate parametric models may be provided for male and female subjects.

Accordingly, the processor 120B may further include an optimizer 126B and a parameter selector 127B. The optimizer 126B may further be configured and operable to compare the positions of each voxel in the parametric model 125B with each voxel in the filtered point cloud 124B. The parameter selector 127B may be operable to receive the results of the comparison and to adjust the parameters accordingly so as generate a new candidate model. Once the optimizer 126B reaches an optimal model wherein no further adjustment significantly improves the candidate model, that candidate model may be selected as the best fit model of the scanned subject.

The subject may itself be characterized by the measurements used as parameter values for generating the best fit model.

Variously, the scanning arrangement may be embedded in a wall, a mirror frame, a window, under the floor, in a ceiling, behind an optical mirror transparent to radio waves or the like as required.

Additionally or alternatively the scanning arrangement itself be directed towards a mirror surface and may be configured and operable to extend the target region into the virtual reflected region inside the mirror. Accordingly, shielded or eclipsed regions of the subject may be rendered visible by reflection within the mirror.

Figure 2:
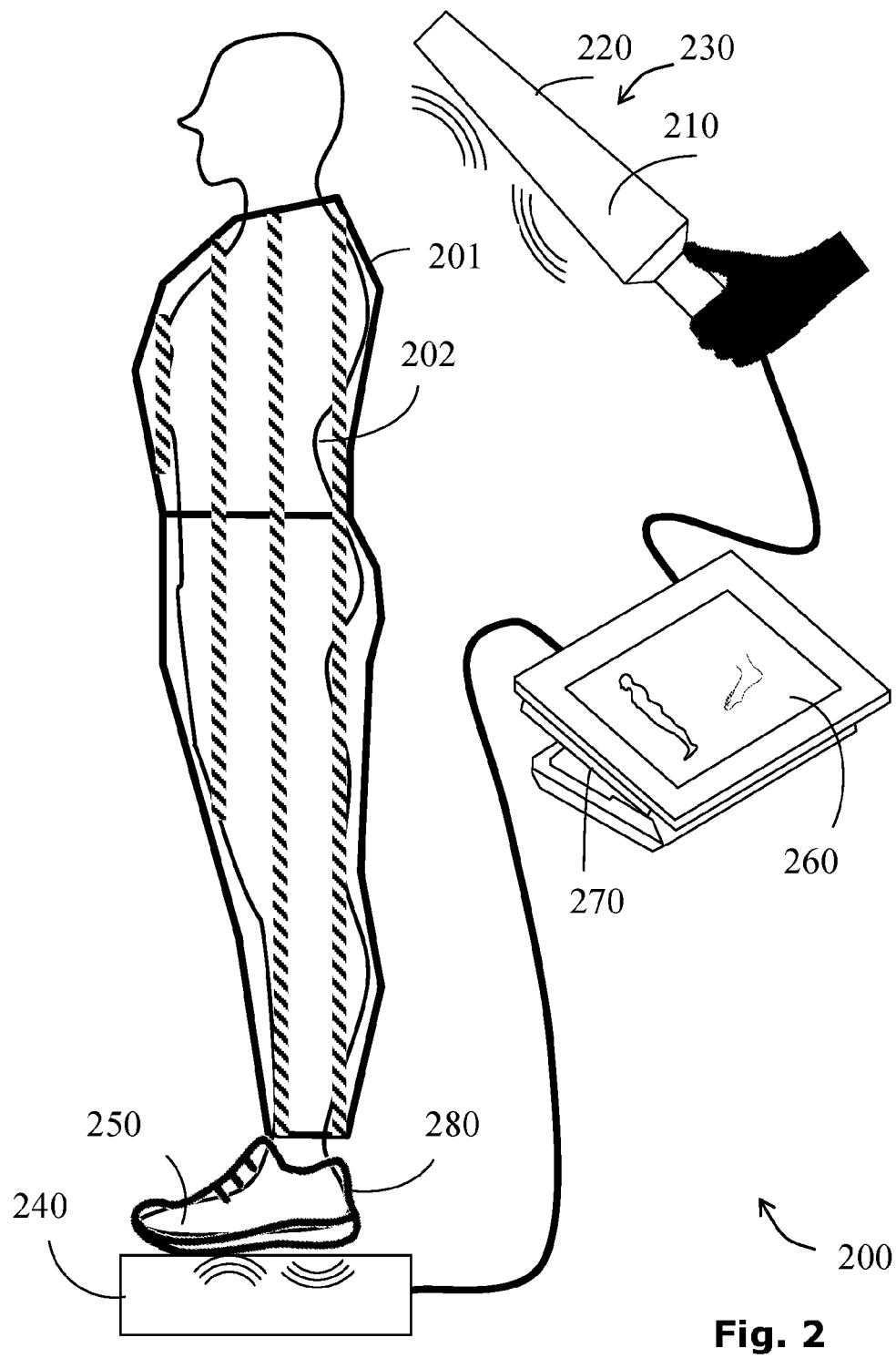
FIG. 2 schematically represents a possible system for imaging surfaces concealed beneath clothing of an individual.

Referring now to FIG. 2, a possible application of the system 200 is illustrated which may be used for imaging surfaces 202 concealed beneath clothing 201 of an individual. The transmitter and receiver of a first radar unit 210 are encased within a movable casing unit 220. This may allow the first radar unit 210 to have dimensions suitable for use as a hand-held scanner 230. For security applications, it may be useful to incorporate secondary sensing units within the movable case 220 such as a metal detector unit, an infrared detector unit, an ultrasound unit and the like. This may assist in the detection of concealed weapons.

Additionally or alternatively, a transmitter and receiver of a second radar unit 240 may be encased in an underfoot unit 240. This underfoot scanner 240 may enable the imaging of surfaces 250 concealed within the shoes 280 of the individual.

A display unit 260 may be provided which communicates with the radar units by wire or by wireless communication as required. The display unit 260 may be a tablet computing device. It is further noted that in other embodiments (not shown) the radar unit itself may be embedded within a tablet computing device.

It is particularly note that because a movable device 230 is not fixed in space, in some embodiments, the system may further include a registration mechanism 270 configured and operable to record the location of the scanning device as it is moved around the outer surface being. The registration mechanism 270 may thus provide a reference position at which each antenna transmits and receives a signal. By knowing the location of the antennas at the point of transmission and reception, a three dimensional map of the concealed surface may be reconstructed.

By way of example, the registration mechanism 270 may include a set of fixed reference beacons. Accordingly, the processor unit may be operable to triangulate the location of the radar unit from the location of the known beacons. Beacons may be active transmitters of a reference beam or alternatively may be fixed reflectors having characteristic reflective properties. Other registration mechanisms will occur to those skilled in the art. Among other methods, video cameras and inertial measurement units (IMU) can assist registering and tracking the motion of the scanning device. Furthermore, the video data can assist with identifying the exterior contour of the object, through which the concealed object is to be detected. Furthermore, acquiring data from more than a single location of the scanning device, the spatial resolution may be further augmented by utilizing larger effective aperture and larger effective number of transmit-receive antenna position combinations.

Another system is presented including a scanning arrangement capable of performing a full body scan on a subject while that subject passes along an unobstructed corridor. It is particularly noted that the full body scan may be capable of scanning every section around the surface of the subject and at any angle, without impeding the forward movement of the subject.

Arrangements are described which allow a scanned beam reflected by any section around the surface of the subject to be detected without either the subject being required to turn or without the scanning machine rotating around the subject.

Accordingly, where required a scanning arrangement may be fixed in place rather than mounted upon a moving scanning head. Typically, the scanning arrangement includes a pair of transceiver arrays facing each other across an unobstructed corridor.

Each transceiver array may include transmitters and receivers configured such that, as the subject passes along a trajectory within the unobstructed corridor, there is a position for each section upon the subject's surface where a scanning beam emitted by at least one transmitter and reflected by that section of the surface is received by at least one receiver.

Figure 3A:
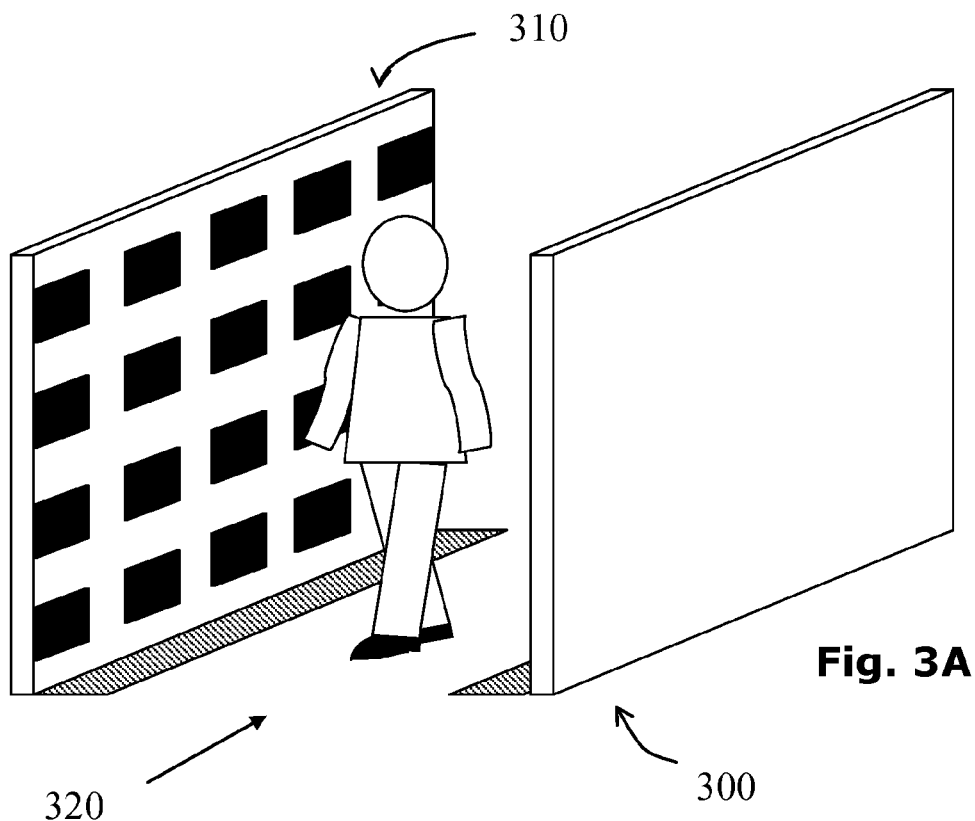
FIG. 3A is a schematic representation of a subject passing through an example of a walk-through full body scanner of the disclosure.
Figure 3B:
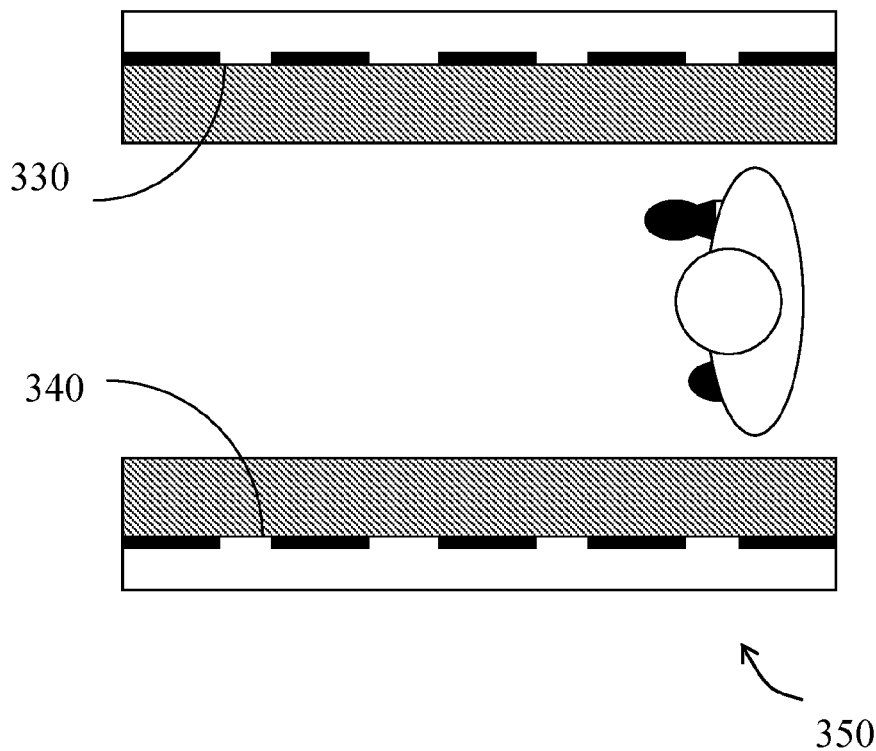
FIG. 3B is a schematic representation of a top view of the example of a walk-through full body scanner of the disclosure.

Reference is now made to FIGS. 3A and 3B which schematically represent respectively an isometric view 300 and a top view 350 of a subject passing through an example of a walk-through full body scanner of the disclosure.

The full body scanner of the example includes a scanning arrangement 310 and a corridor through which the subject may pass 320.

The scanning arrangement includes a first array of transceivers 330 and a second array facing the first array 340. The corridor 320 through the scanning arrangement provides an unobstructed path between the facing arrays of the scanning arrangement.

As the subject passes along the unobstructed path, radiation emitted by transmitters of the scanning arrangement is reflected from the subject to be detected by receivers. Variously, the scanning radiation may be emitted by a transmitter of the first array and reflected by the subject back towards receivers of the first array. Similarly the scanning radiation may be emitted by a transmitter of the second array and reflected by the subject back towards receivers of the second array.

Alternatively, the scanning radiation may be emitted by a transmitter of one array and reflected by the subject towards receivers of the other array. Thus radiation received by the first array may have been emitted by the first array or the second array. Similarly radiation received by the second array may have been emitted by first array or the second array.

In order to provide 360 degree all round scanning, the dimensions, such as length and width of the corridor are chosen such that a subject passing along the length of the corridor will at some position along the path reflect scanning radiation towards a receiver from every part of its surface. Accordingly, as the subject passes along the unobstructed path, for each surface-section of the subject, there is a position along the path at which scanning radiation transmitted from at least one transmitter of the scanning arrangement is reflected by that surface-section and received by at least one receiver of the scanning arrangement. Furthermore, where appropriate, it may be possible to achieve full 360 degree coverage in as small a number of frames as possible.

Although only two walls are indicated in the figure for illustrative purposes, where required, additional scanning arrays may be provided above and below the corridor to increase coverage range when necessary.

Various transceivers may be selected such that they emit and detect any suitable form of radiation which may reflect from the surface of the subject being scanned. For example the array may include electromagnetic transceivers, such as radio wave transceivers, x-ray transceivers or the like as well as combinations thereof. Additionally or alternatively, the array may include other transceivers such as sonic transceivers, ultrasonic transceivers, beta-ray emitters and detectors or the like as required.

In particular examples, electromagnetic transceivers may be organized in transceiver units including at least one linear phase array transmitter and at least one perpendicular linear phase array receiver. Each transceiver unit may be controlled by a dedicated control chip or multiple control chips as required. The scanning arrangement typically includes multiple transceiver units arranged in a matrix array both horizontally and vertically as required so as to provide uninterrupted scanning coverage throughout the corridor anywhere up to the height of a typical subject.

Figure 4A:
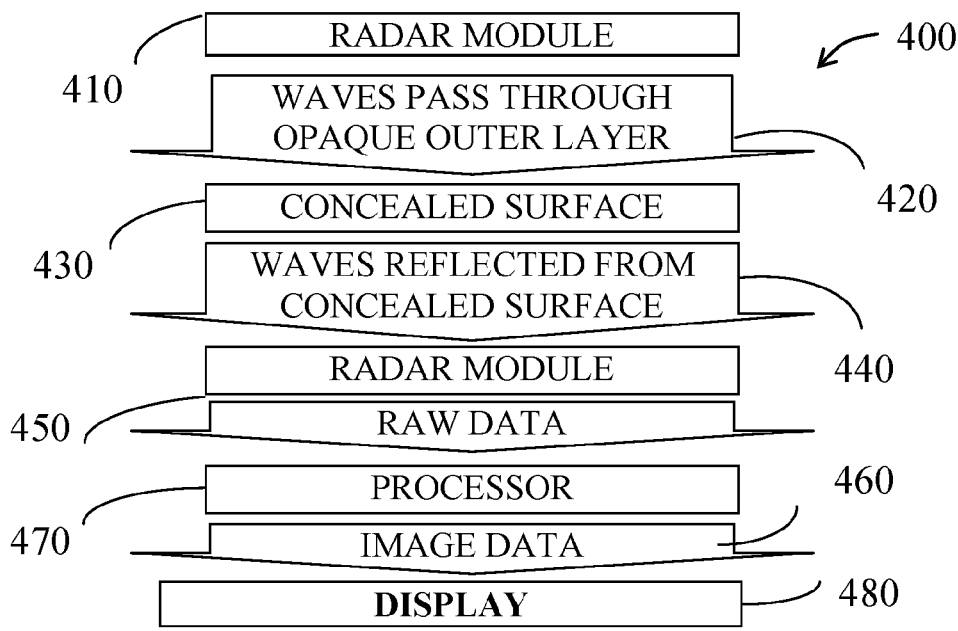
FIGS. 4A-C flowcharts indicating selected steps of a method for processing of radar data and generating an image of the concealed surface.

A central controlling unit may be provided which is configured and operable to process signals transmitted and received by all the transmitted of the scanning array. The central controlling unit may include, for example by a computer Referring now to the flowchart of FIG. 4A, which illustrates data flow through the system 400, the radar module 410 produces waves which pass through the opaque outer layer 420 to the concealed surfaces 430 therebehind. Waves reflected back through the concealed surface 430 are received by the radar unit 440 and raw data 450 is recorded thereby. The raw data may then be processed by the processor 460 to produce image data 470 which may be used by the display device 480 to construct and image.

Figure 4B:
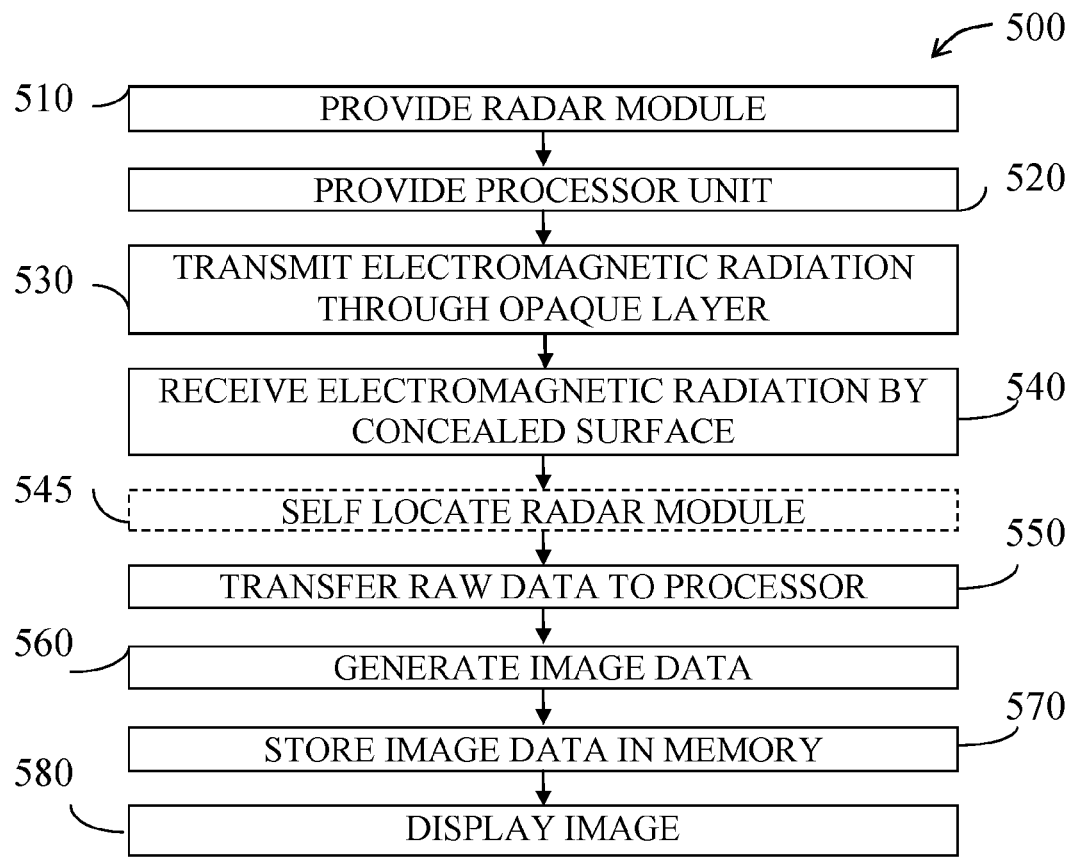

Accordingly a method is taught for imaging a concealed surface covered by an opaque outer layer. With reference to FIG. 4B, the method 500 may include the steps of providing a radar unit 510 comprising at least one transmitter antenna connected to an oscillator and at least one receiver antenna; providing a processor unit 520; transmitting electromagnetic waves through the opaque outer layer 530 towards the concealed surface; receiving electromagnetic waves reflected by the concealed surface 540; transferring raw data to the processor 550; generating image data 560 based upon raw data received from the radar unit; storing the image data in a memory unit 570; and adjusting a display device to represent the concealed surface on a display 580.

Optionally, the method may further include self locating of the radar module 545 in order to record the scanning device's own location. The self location step may include triangulating the radar unit's position.

Figure 4C:
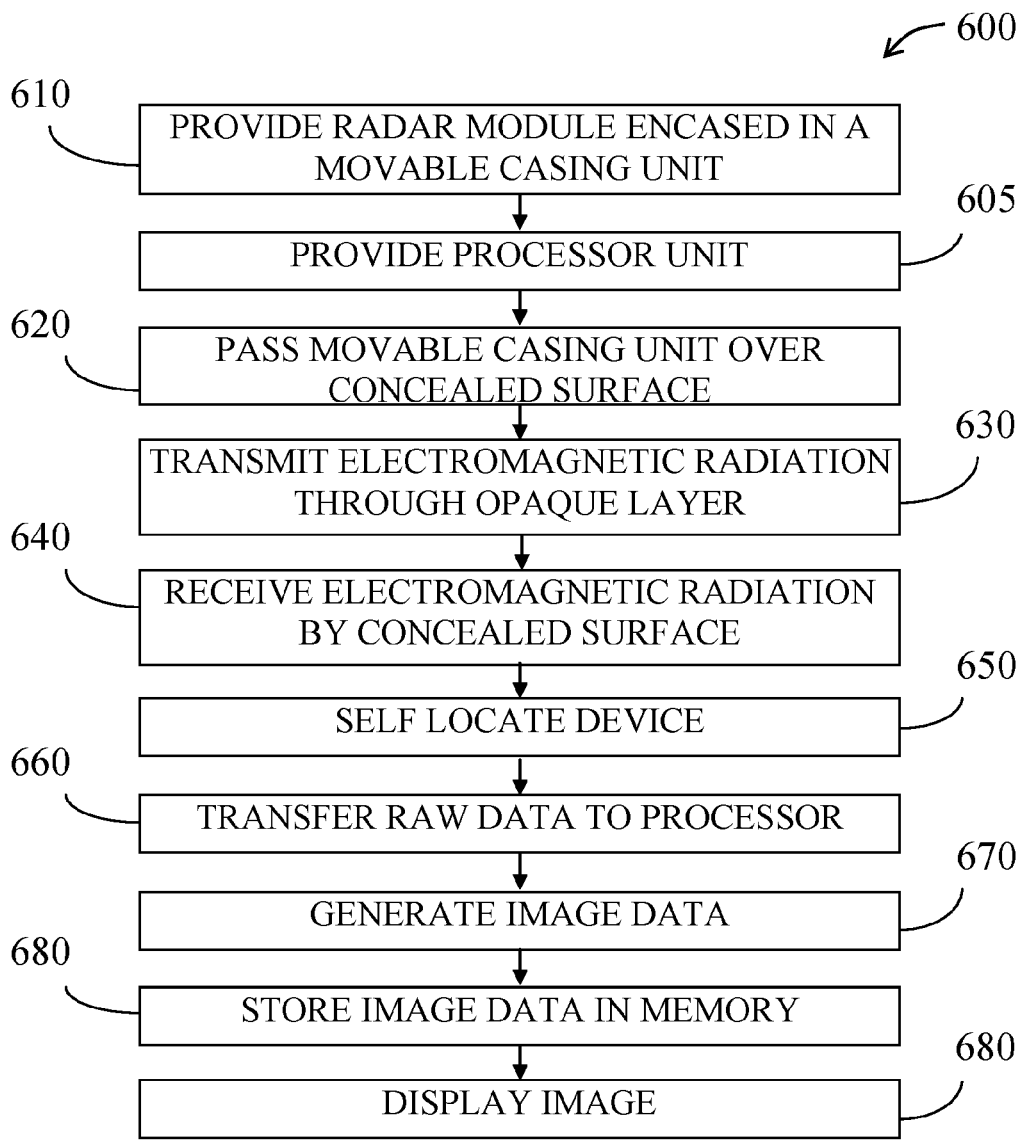

Referring now to the flowchart of FIG. 4C which illustrates how the method 600 may be adapted for use with a hand-held scanner by providing a radar unit comprising at least one transmitter antenna connected to an oscillator and at least one receiver antenna and providing a movable casing unit encasing the radar unit 610; providing a processing unit 605 and passing the movable casing over the concealed surface 620 while transmitting electromagnetic waves through the opaque outer layer 630 towards the concealed surface; receiving electromagnetic waves reflected by the concealed surface 640; self locating the radar unit 650; transferring raw data to the processor 660; generating image data based upon raw data received from the radar unit 670; storing the image data in a memory unit 680; and adjusting a display device to represent the concealed surface on a display 690.

Figure 4D:
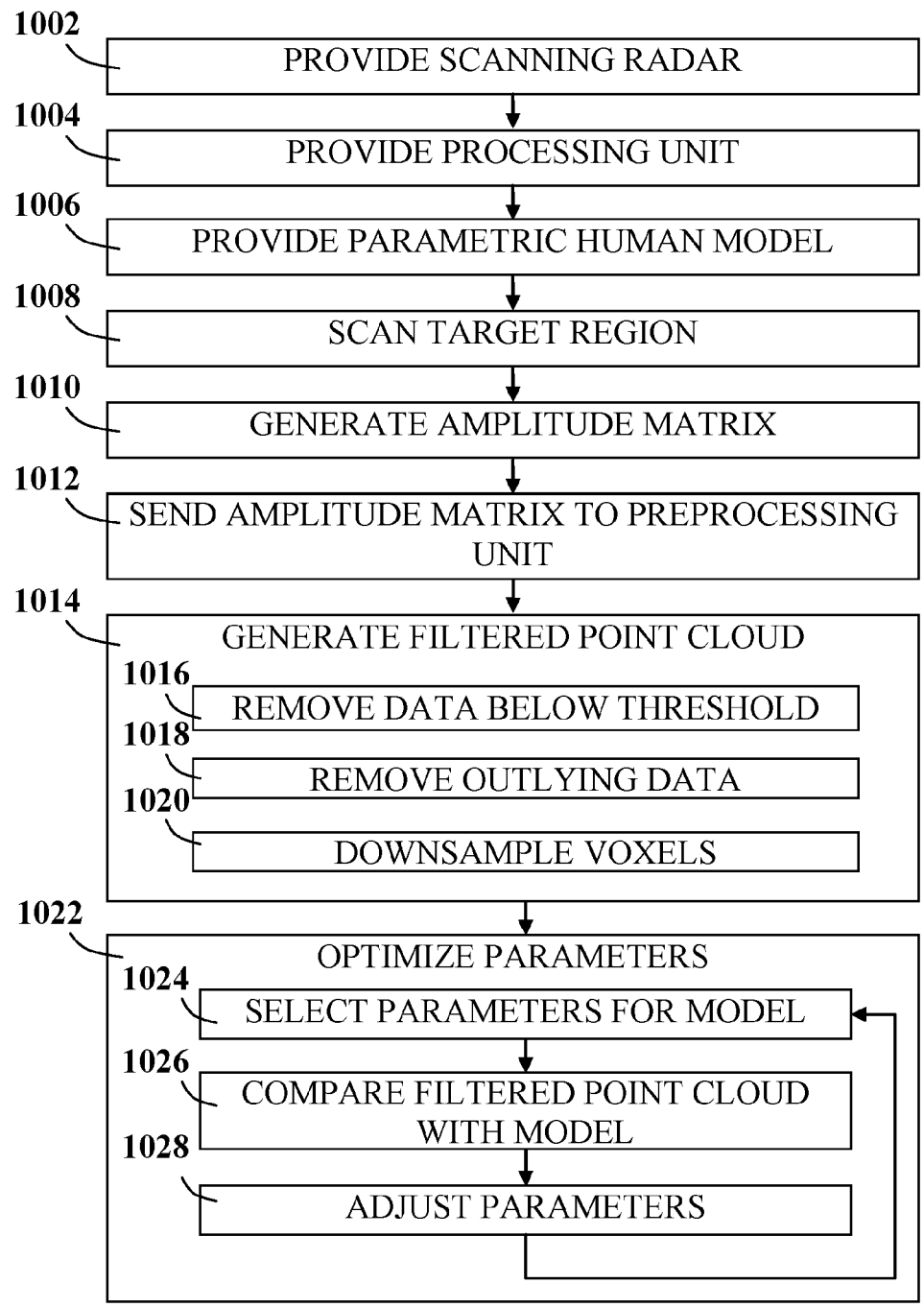
FIG. 4D is a flow diagram illustrating a method for scanning body of a subject and ascertaining body measurement of a subject using a radar based body scanning system of the disclosure.

Referring now to FIG. 4D is a flow diagram illustrating a method for scanning body of a subject and ascertaining body measurement of a subject using a radar based body scanning system 100B.

The method incudes, providing a scanning radar 1002, providing a processing unit 1004, and providing a parametric human model 1006.

The scanning arrangement may scan a subject may be in the target region in front of the array 1008, thereby generating amplitude data for the region 1010.

The amplitude matrix is sent to a preprocessing unit 1012, which generates a filtered point cloud 1014. Optionally, the data may be processed by removing data below a threshold amplitude value 1016, removing outlying data 1018 and downsampling voxels 1020.

The resulting point cloud may be sent to a processor where a model is optimized 1022 for example by selecting a candidate set of parameters 1024, comparing the point cloud with the candidate model 1026, adjusting parameters 1028 and repeating until no further improvements are made.

It is particularly note that the output of the scanning device is a three dimensional point cloud. However, some of the regions of the point cloud may be missing from the scan for example due to shielding effects or regions at angles with poor coverage. Various compensation techniques may used to interpolate for the missing data such as local averaging or the like.

Various optimization processes may be used for example, defining an objective function, comparing the candidate parametric model with the scanned point cloud, identifying which voxels in the candidate parametric model are geometrically closest to corresponding points in the point cloud, and calculating the Euclidean distance $\Delta$ between these points as given by:

$$\Delta = \sqrt{(x-x_m)^2 + (y-y_m)^2 + (z-z_m)^2}$$

where x is the x-coordinate of the point in the point cloud, xm is the x-coordinate of the closest point in the candidate parametric model, y is the y-coordinate of the point in the point cloud, ym is the y-coordinate of the closest point in the candidate parametric model, z is the z-coordinate of the point in the point cloud, and zm is the z-coordinate of the closest point in the candidate parametric model.

The value of the sum of all the Euclidean distances $\Sigma\Delta i$ may be minimized by various optimization algorithms, such as Sequential Least Squares Quadratic Programming (SLSQP) for example. In this way the optimal parameters may be selected for the human parametric model. Other optimization methods will occur to those skilled in the art.

The generated best fit model may be used to find full body measurements even from missing parts in the scan and potentially of body parts that haven't been scanned at all.

Reference is now made to FIGS. 5A-F (700) which shows a pair of facing scanning arrays 710 having a wall-length dy on either side of a corridor having a corridor-width dx 720. A surface element of a subject is shown at a position (x0,y0) in the space at various inclination angles $\theta$. FIGS. 5A-F are provided to illustrate various limiting inclination angles 730 of surface elements which provide possible limits for the required dimensions dx, dy of the scanning unit.

Figure 5A:
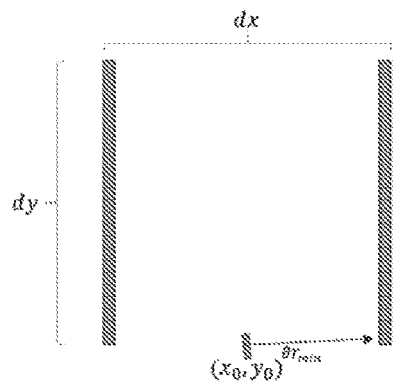
FIGS. 5A-F are schematic geometrical representations indicating inclination angles of reflective elements on the surface of a scanned subject.
Figure 5B:
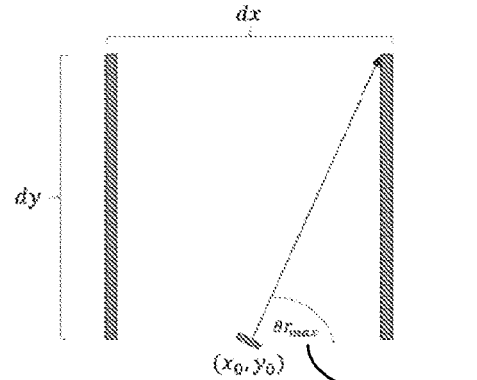

FIGS. 5A and 5B indicate the minimum inclination angle Armin and maximum inclination angle $\theta$max at which scanning radiation emitted from the first transceiver array wall (the right-side wall) is reflected back to the first transceiver array by the surface element at (x0,y0) situated at the entrance to the array.

It may be shown that $\theta r_{min} =$ $$\arctan\left(\frac{y_{min}}{x_0}\right) = 0° \text{ and that } \theta r_{max} = \arctan\left(\frac{dy}{x_0}\right).$$

Figure 5C:
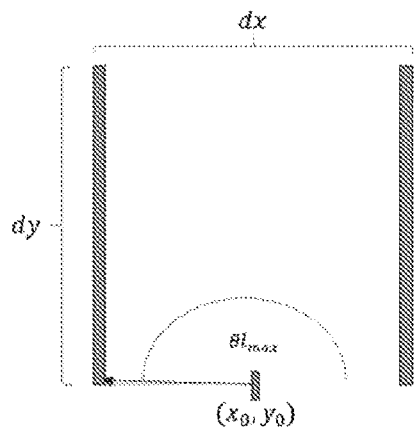
Figure 5D:
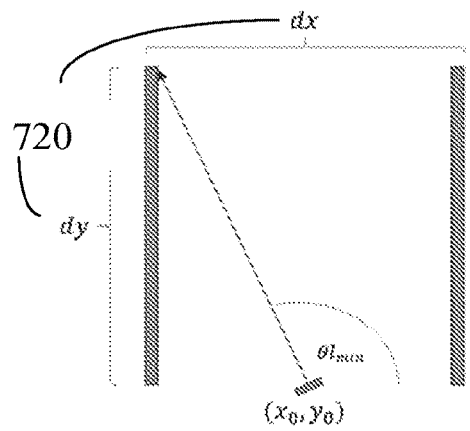

FIGS. 5C and 5D indicate the minimum inclination angle $\theta$min and maximum inclination angle $\theta$max at which scanning radiation emitted from the first transceiver array wall (the right-side wall) is reflected back to the first transceiver array by the surface element at (x0,y0).

It may be shown that $\theta l_{min} =$ $$180 - \arctan\left(\frac{dy}{dx-x_0}\right) \text{ and that } \theta l_{max} = 180 - \arctan\left(\frac{y_{min}}{dx-x_0}\right) = 180°.$$

Accordingly, beams of scanning radiation transmitted by transmitters along the right side are received by receivers along the right side for surface inclination angles $\theta$ over the right-side range $0 < \theta < \arctan(dy/x_0)$.

Similarly, beams of scanning radiation transmitted by transmitters along the left side are received by receivers along the left side for surface inclination angles $\theta$ over the right-side range $$180 - \arctan\left(\frac{dy}{dx-x_0}\right) < \theta < 180$$

This leaves a coverage gap between the angle range $$180 - \arctan\left(\frac{dy}{dx-x_0}\right) < \theta < \arctan\left(\frac{dy}{x_0}\right).$$

Therefore, the conditions for 360 degree coverage (which is achieved by covering the first 180 degrees between the entrance and the center of the corridor and covering the remaining 180 degrees between the center of the corridor and the exit) are that this coverage gap is filled by beams of scanning radiation transmitted by transmitters along one side and received by receivers along the other side.

Figure 5E:
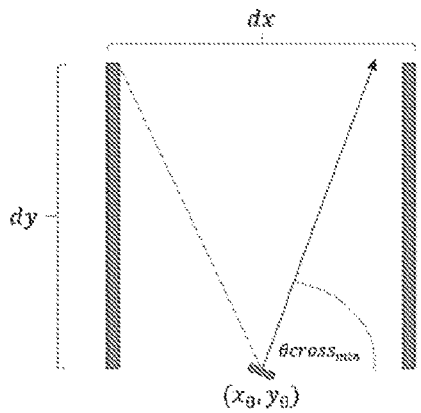
Figure 5F:
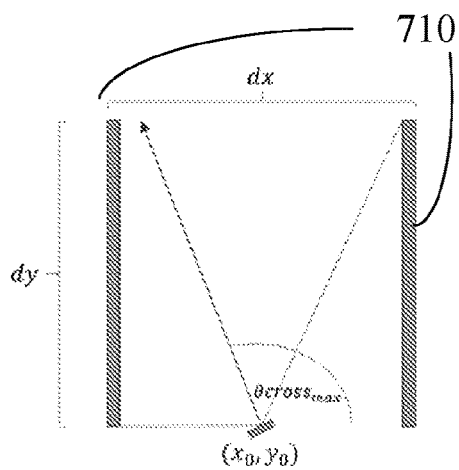

FIGS. 5E and 5F which indicate the minimum inclination angle $\theta cross_{min}$ and maximum inclination angle $\theta cross_{max}$ at which scanning radiation emitted from the first transceiver array wall (the right-side wall) is reflected towards the second transceiver array (the left-side wall) by the surface element at (x0,y0). It is noted that these angles are also the minimum and maximum inclination angles at which scanning radiation emitted from the second transceiver array wall (the left-side wall) is reflected towards the first transceiver array (the right-side wall).

It may be shown that $$\theta cross_{min} = \frac{\alpha_r}{2} = \frac{\theta l_{min}}{2} = \frac{180° - \arctan\left(\frac{dy}{dx-x_0}\right)}{2} \text{ and that } \theta cross_{max} =$$

$$180° - \frac{\alpha_l}{2} = \frac{180° + \arctan\left(\frac{dy}{x_0}\right)}{2} = \frac{180° + \theta r_{max}}{2}.$$

This cross-side range needs to abut or overlap with the right-side and the left-side ranges. The conditions for this are:

$$\theta cross_{min} \leq \theta r_{max} \text{ or } \frac{180° - \arctan\left(\frac{dy}{dx-x_0}\right)}{2} \leq \arctan\left(\frac{dy}{x_0}\right) \quad (1)$$

-continued $$\theta cross_{max} \le \theta l_{min} \text{ or } \frac{180° + \theta r_{max}}{2} \le \left(180 - \arctan\left(\frac{dy}{dx - x_0}\right)\right) \quad (2)$$

Therefore, the dimensions of the scanner dx and dy may be selected such that these conditions are met. It is noted that in various application, the corridor-width may be selected such that a subject may comfortably walk through, then the corresponding required wall-length may be calculated accordingly.

By way of example, for illustrative purposes only, if the corridor-width is selected such that dx=1 m, then for, y_0=0 and within the lateral range [(0.15 m≤x)]_0≤0.85 m. The corresponding required wall-length dy may be calculated as follows:

$x_0=0.15$:(1)$\theta cross_{min} \le \theta r_{max} \rightarrow dy \ge 0.526m$
(2)$\theta cross_{max} \ge \theta l_{min} \rightarrow dy \ge 0.988m$ $x_0=0.5$:(1)$\theta cross_{min} \le \theta r_{max} \rightarrow dy \ge 0.866m$
(2)$\theta cross_{max} \ge \theta li_{min} \rightarrow dy \ge 0.866m$ $x_0=0.85$:(1)$\theta cross_{min} \le \theta r_{max} \rightarrow dy \ge 0.988m$
(2)$\theta cross_{max} \ge \theta l_{min} \rightarrow dy \ge 0.526m$ This means that a well sampled array of dimensions 0.988 m×1 m should give reasonable coverage for a convex object consisting of reflecting sections at inclination angles ranging between 0°-180°.

With reference now to FIGS. 6A-K, various simulations are compared for possible multiple array setups involving two facing transceiver arrays having three or four phase array electromagnetic transceiver units per panel at varous spacings.

Figure 6A:
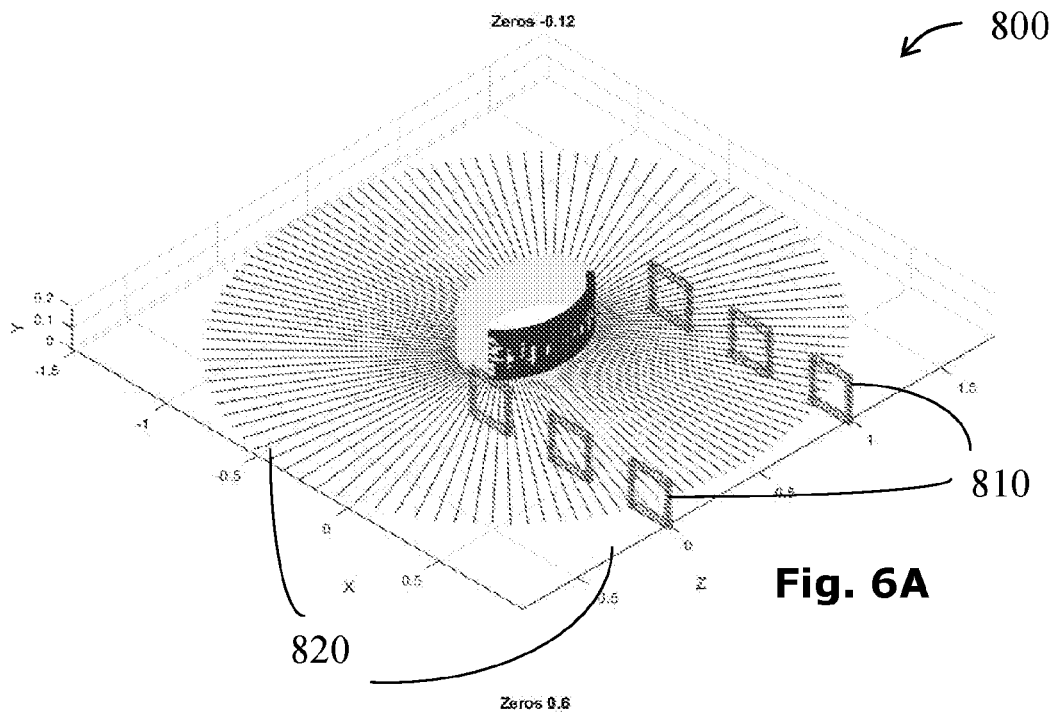
FIGS. 6A-K illustrate simulated results showing the extent of exposure achieved by various possible scanner array configurations.
Figure 6B:
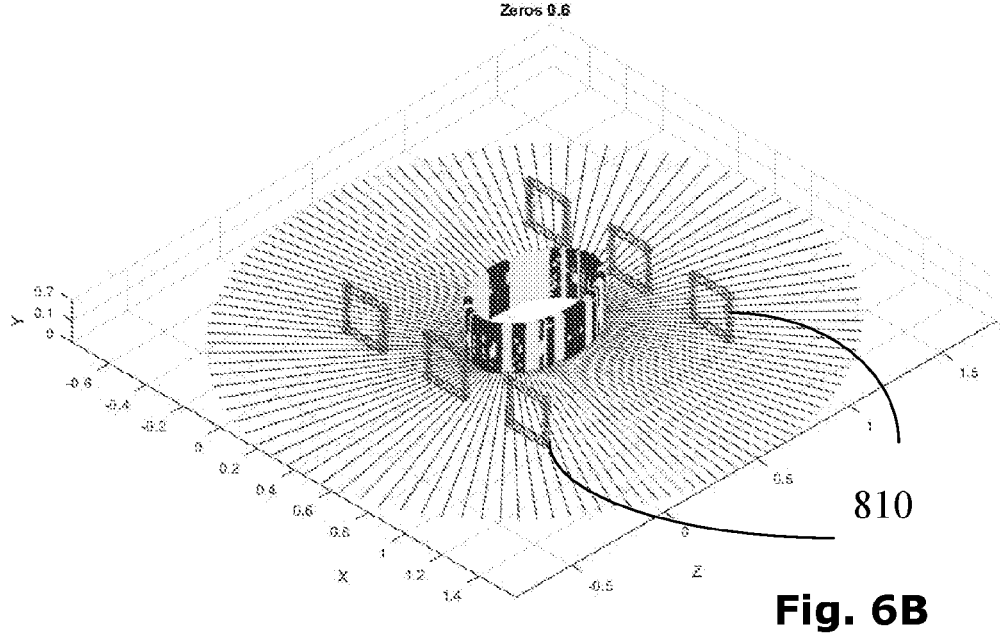

With particular reference to FIGS. 6A and 6B (800), the results are presented of a simulation of a convex reflecting surface scanned by a first configuration in which each of the facing transceiver arrays includes three 20 cm transceiver units 810 arranged along the side walls 820 with a spacing of 21 cm therebetween. The overall wall-length is thus 102 cm which is greater than the required 98.8 cm.

Dark regions of the reflecting surface indicate that scanning radiation reflected from that surface section are received by receivers such that the dark regions are successfully scanned.

It is particularly noted that although it may not be possible to expose all surface sections in a single frame. As the subject passes through the corridor each point may be successfully scanned at least once.

As indicated by the dark regions of the surface, it is noted that, in the first configuration the front edge is well scanned when the subject is at the proximal end of the corridor with only small regions which are not exposed. Likewise there is reasonable coverage of the sides of the surface when the subject is at the midpoint of the corridor. It will be appreciated that the unexposed regions at one point along the corridor may be scanned successfully at another such point.

Figure 6C:
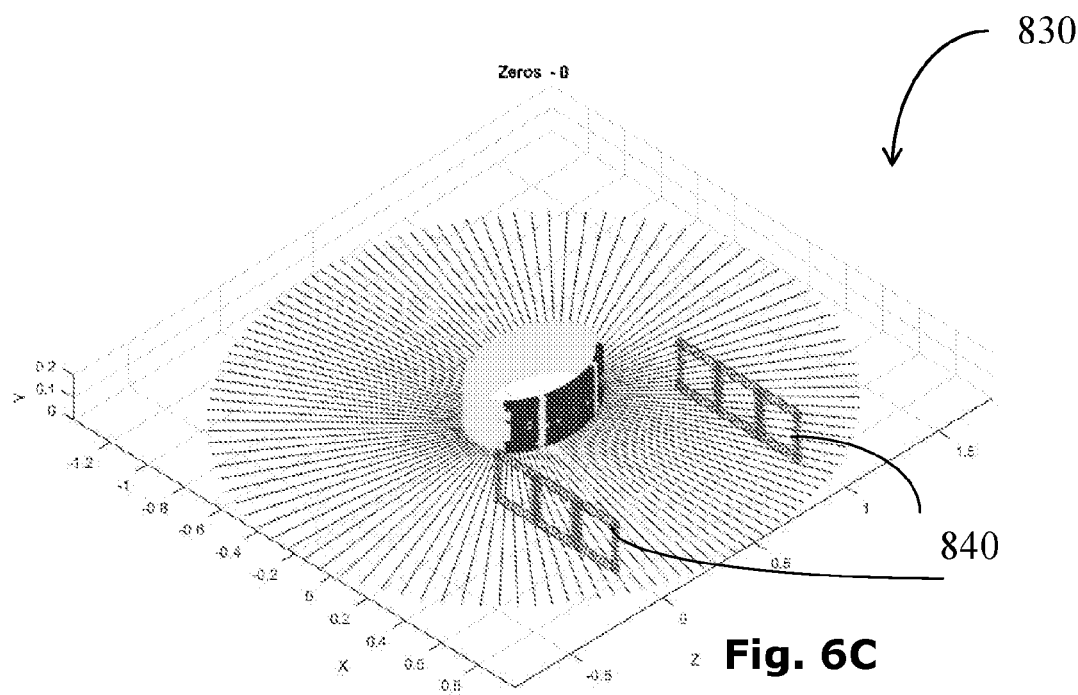
Figure 6D:
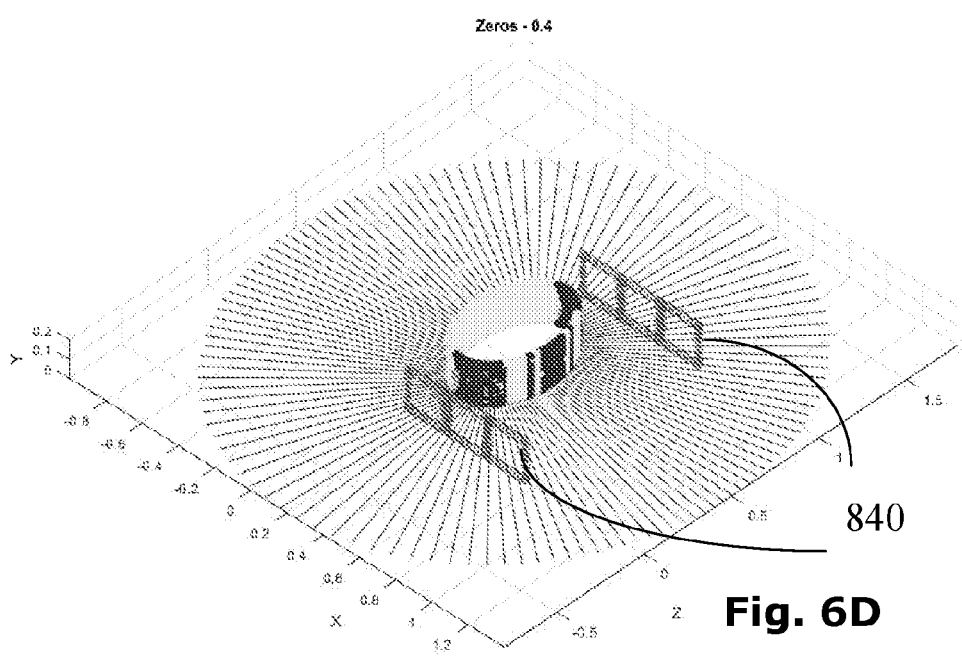

With particular reference now to FIGS. 6C and 6D (830), the results are presented of a simulation of a convex reflecting surface scanned by a second configuration in which each of the facing transceiver arrays includes three 20 cm transceiver units arranged along the side walls with no spacing 840 therebetween.

As indicated by the dark regions of the surface, it is noted that, again in the first configuration the front edge is well scanned when the subject is at the proximal end of the corridor with two significant gaps at inclination angles of about 25-30 degrees which are not exposed. Likewise there is reasonable coverage of the sides of the surface but again significant gaps at inclination angles in the region 25-40 when the subject is at the midpoint of the corridor. The unexposed gap may be due to the reduced length of the array (60 cm) which is less than the required 98.8 cm.

Figure 6E:
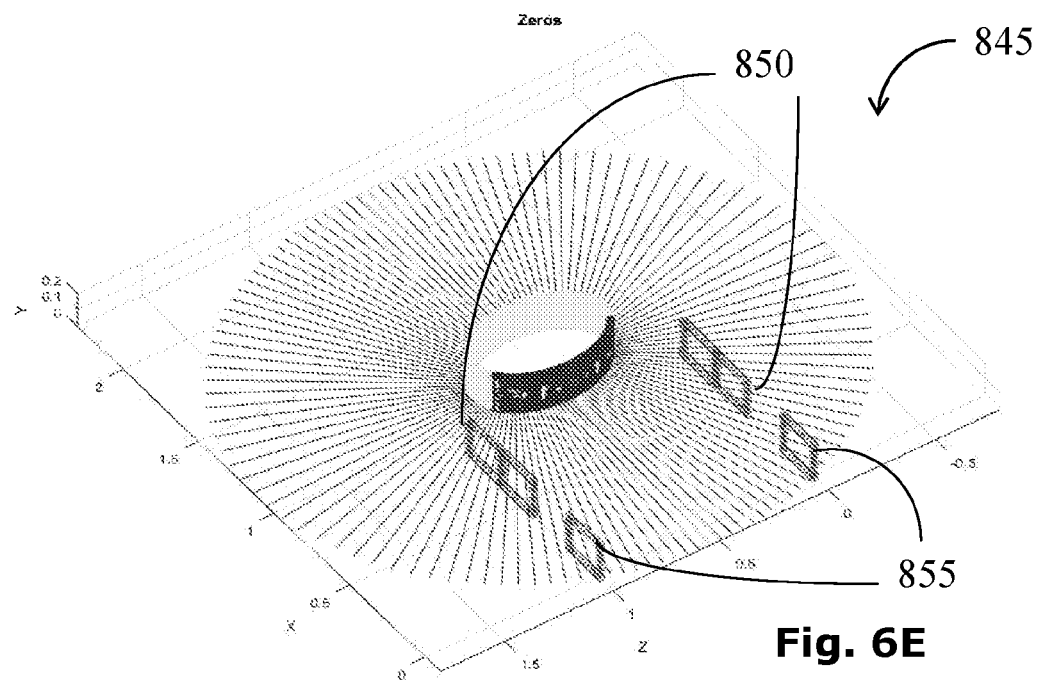
Figure 6F:
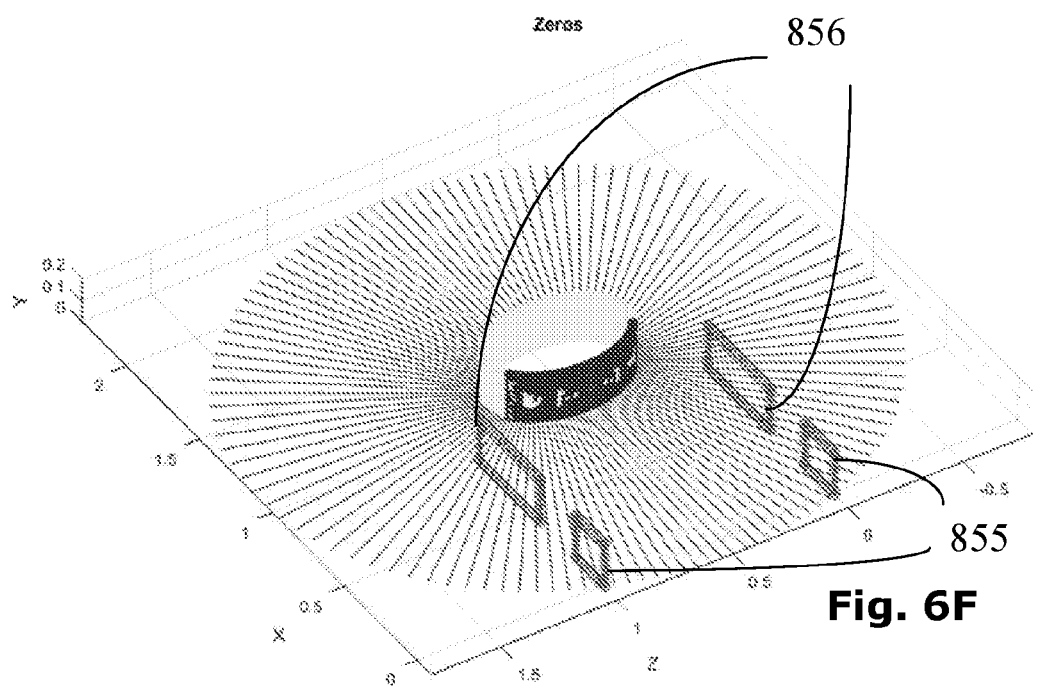

Referring now to FIGS. 6E and 6F (845), the results are presented of a simulation of the convex reflecting surface scanned by a third configuration in which each of the facing transceiver arrays includes three 20 cm transceiver units arranged along the side walls such that the first and second transceiver units 850 abut to form a 40 cm panel and the third transceiver unit 855 is spaced at 20 cm from the second. The overall wall-length is thus 80 cm which is less than the required 98.8 cm. As indicated by the dark regions of the surface, it is noted that, are again significant gaps at various inclination angles due to the reduced length of the array. It is noted that such a non-symmetric arrangement may allow a reduced number of transceiver units 856 to perform a scan in a shorter time.

Figure 6G:
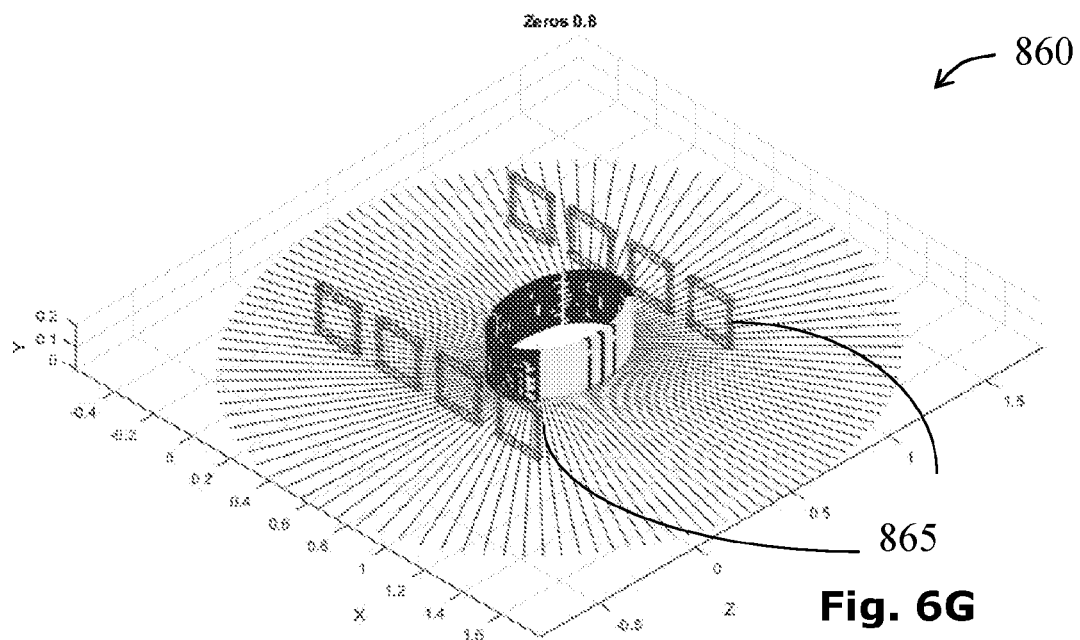
Figure 6H:
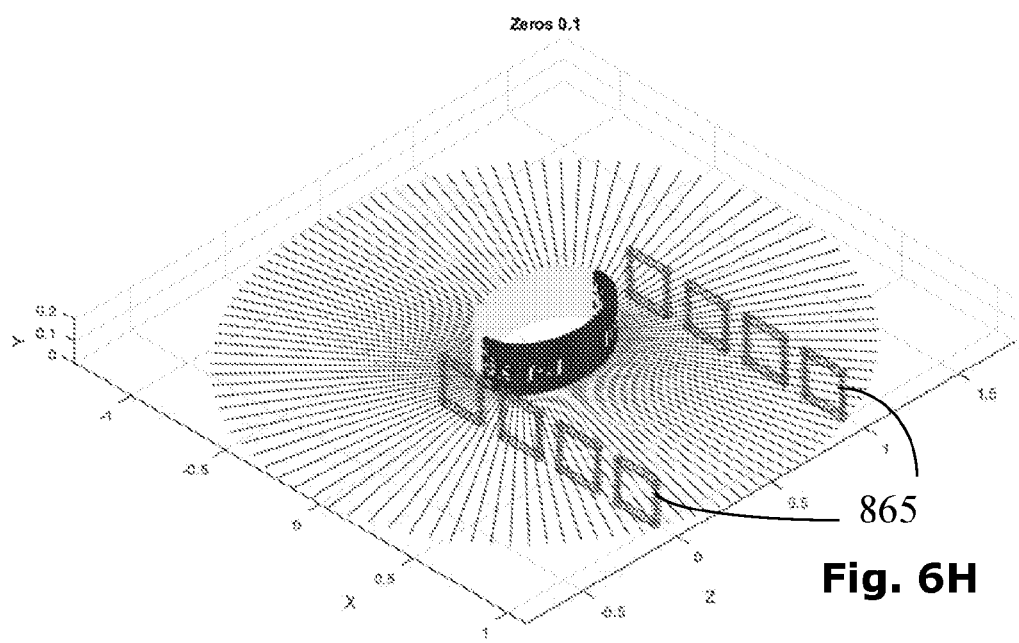

With reference now to FIGS. 6G and 6H (860), the results are presented of a simulation of the convex reflecting surface scanned by a fourth configuration in which each of the facing transceiver arrays includes four 20 cm transceiver units 865 arranged along the side walls with a spacing of 10 cm therebetween. The overall wall-length is thus 110 cm which is greater than the required 98.8 cm. As expected, the dark regions of the surface indicate very good scanning exposure with very few gaps at all inclination angles.

Figure 6I:
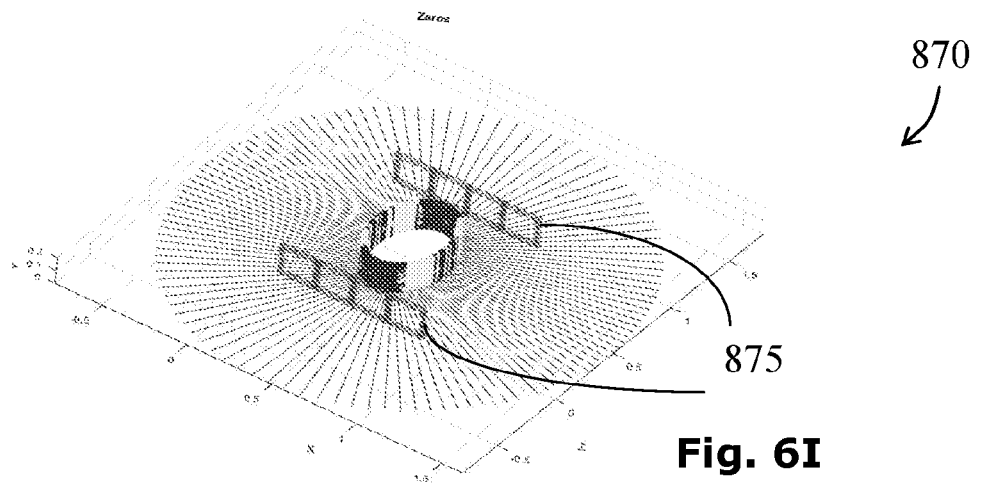
Figure 6J:
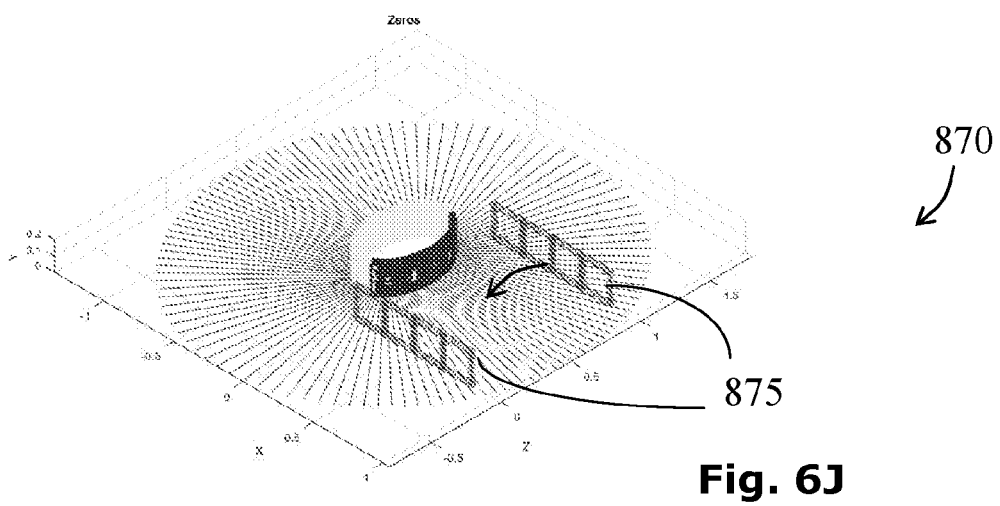
Figure 6K:
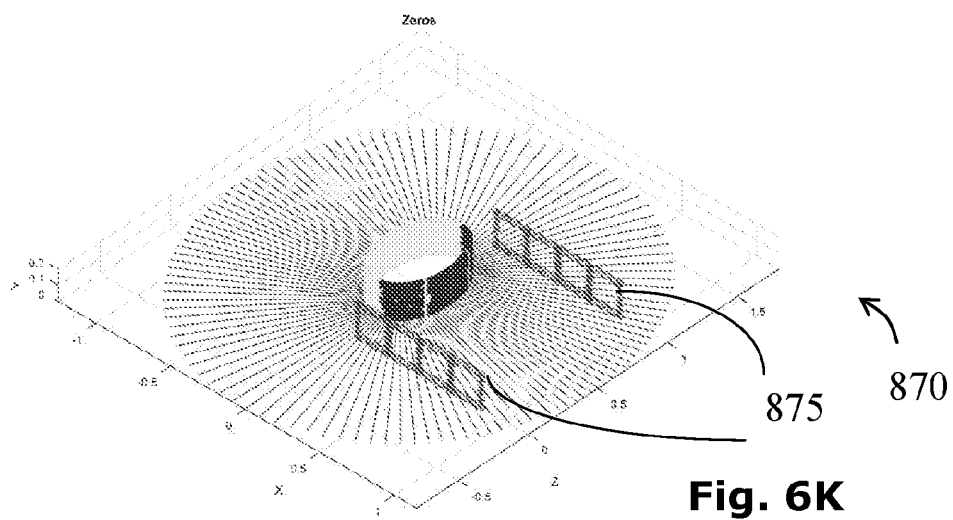

Reference now to FIGS. 6I, 6J and 6K (870), the results are presented of a simulation of a convex reflecting surface scanned by a fifth configuration in which each of the facing transceiver arrays includes four 20 cm transceiver units 875 arranged along the side walls with no spacing therebetween. Here the effective overall wall-length is 80 cm. Here there is good coverage at all surface inclination angles with a possible 'blind spot' at about 25-30 degrees as the wall-length is less than the required 98.8 cm. Again it is noted that it may be possible to reduce the number of transmission antennas to reduce scan time.

It is noted that, in some applications, the full body scanner may require a corridor having a margin of a particular width from each wall in order to be sure that the transceivers cover the full range.

Figure 7A:
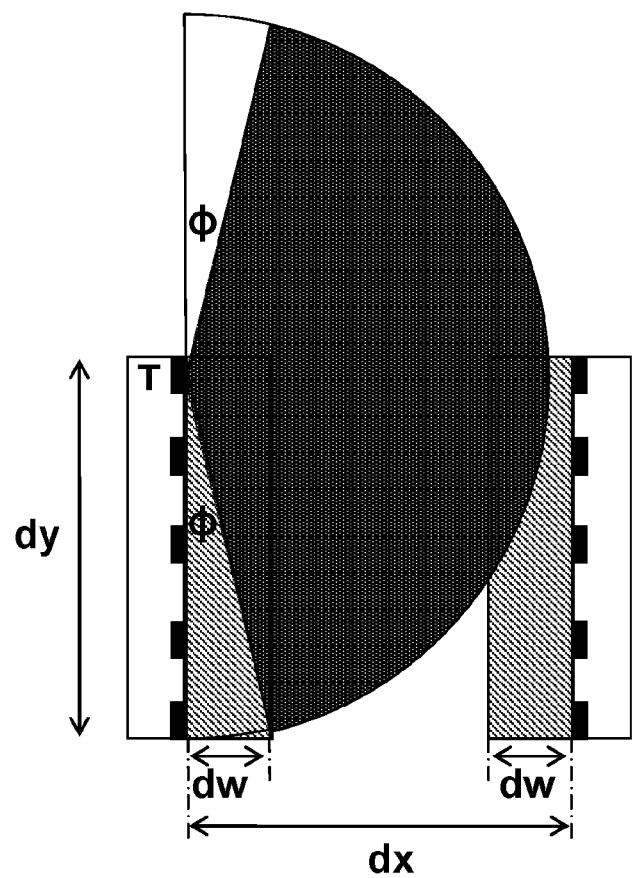
FIG. 7A is a schematic representation indicating the width of a possible margin along the walls of the scanning arrangement of a full body scanner of the disclosure.

Referring now to FIG. 7A which is a schematic representation indicating a scanning arrangement with a possible margins on either side of the corridor having a margin-width dw parallel to the walls.

The angular transmission range of a transmitter T is indicated as a lobe having a cross-section being a sector of a circle slightly smaller than a semicircle. On either side of the transmission lobe there is an angular gap of $\phi$ in which the transmitter does not transmit.

Accordingly at the extremities of the corridor there is a margin of width dw which is not exposed to the scanning radiation. It can be shown that the margin-width dw relates to the angular gap $\phi$ as dw=dytan$\phi$.

Consequently, the effective scanning width is the difference between the corridor-width dx and two margin-widths. Thus a subject may pass along the unobstructed path through the corridor at a path-distance x0 from the first wall where x0 ranges from dw to (dx-dw).

$$dy \tan \phi < x_0 < dx - dy \tan \phi$$

Figure 7B:
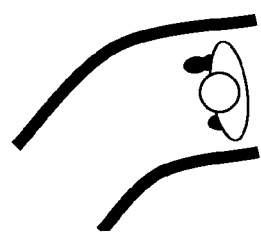
FIGS. 7B and 7C illustrate possible alternative full body scanners of the disclosure.
Figure 7C:
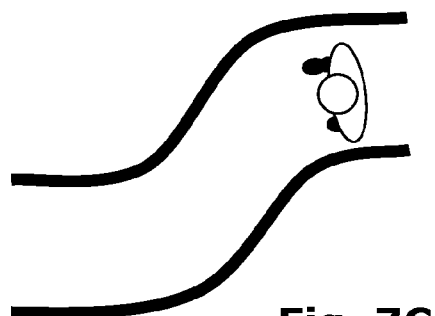

Although only planar transmission arrays are described above, it is noted that other configurations may be considered such as the curved paths 880B, 880C indicated in FIGS. 7B and 7C. Still other full body scanners may occur to those skilled in the art.

Still other scanning devices may be used to monitor card readers and to detect malicious hardware devices such as insert skimmers. Credit card readers, such as cash machines, ATMs, vending machines etc. are vulnerable to criminal attempts to access credit card details. For example, an insert skimmer is a very thin malicious hardware device which is designed to be introduced into the card acceptance slot itself where it is completely hidden. Such insert skimmers capture card data from the magnetic stripe on the backs of cards allowing criminals to fabricate duplicate cards. Because such devices are inserted completely into the device, they are often extremely difficult to detect. There is, therefore, for a need for an insert detector for use in card readers. The invention described herein addresses the above-described needs.

Radar chips may be used to monitor vulnerable card readers so as to detect radiation reflected from malicious hardware devices such as insert skimmers introduced into card acceptance slots.

It is noted that the use of radio wave monitoring allows for detection with sufficiently low resolution that, although the insert is readily detected by the reflected radiation energy, the details of an inserted card are not themselves identifiable.

It may be possible to define a relationship between the distance from a reflecting surface of the target to the radar array and the spacing of the transceiver units within the radar array. This relationship may be used to ensure coverage of the reflecting surface by the radar array.

Figure 8A:
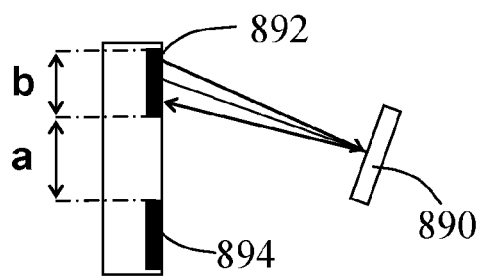
FIGS. 8A-F are schematic geometrical representations indicating possible spacings between transceivers of a radar array.

Referring now to FIGS. 8A-F, geometrical representations are shown indicating possible spacing between adjacent transceivers in a radar array. In particular FIG. 8A illustrates an array in which a particular reflecting element 890 is situated such that the normal vector from the reflecting element points towards a transceiver 892. In this configuration, the incident vector from a transmitter is reflected back to a receiver within the same transceiver.

Figure 8B:
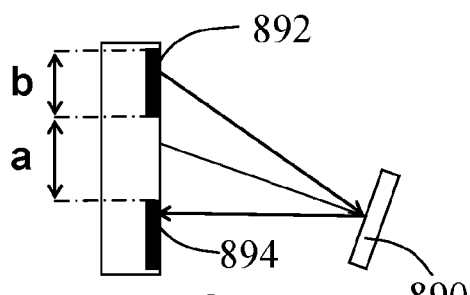

FIG. 8B shows the array in which the particular reflecting element 890 is situated such that the normal vector from the reflecting element points towards the gap between a first transceiver unit 892 of the array and a second transceiver unit 894 of the array adjacent to the first. In this configuration, the incident vector from a transmitter within the first transceiver unit 892 is reflected back to a receiver within the second transceiver unit 894.

Figure 8C:
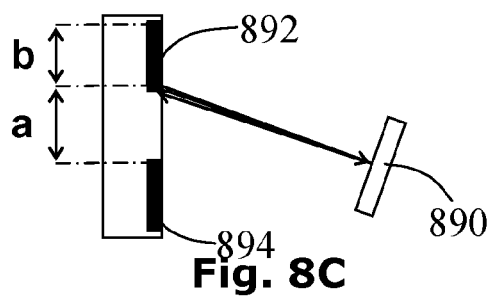
Figure 8D:
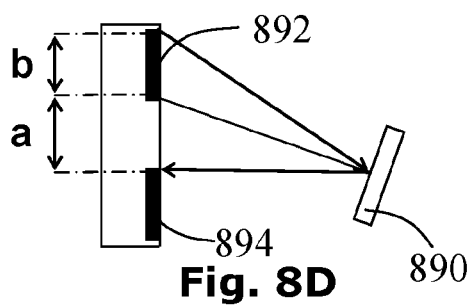

In order to maximize coverage of the radar array, a spacing may be selected such as illustrated in FIGS. 8C and 8D. In this configuration spacing is selected such that at the transition point, where the normal vector from the reflecting element 890 points towards the very end of the first transceiver unit 892 two conditions are met. The first condition is that at the transition point, an incident vector from the closest transmitter to the end of the first transmitter is reflected back towards a receiver on the first transceiver unit 892. The second condition is that at the transition point, an incident vector from the furthest transmitter from the end of the first transmitter 892 is reflected back towards a receiver on the adjacent second transceiver unit 894.

Figure 8E:
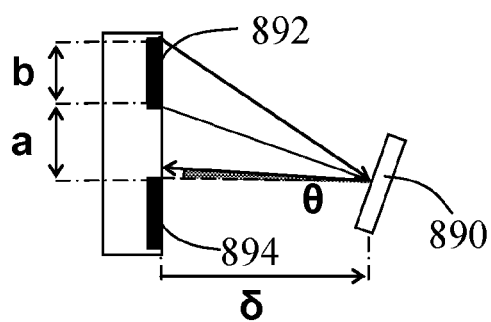
Figure 8F:
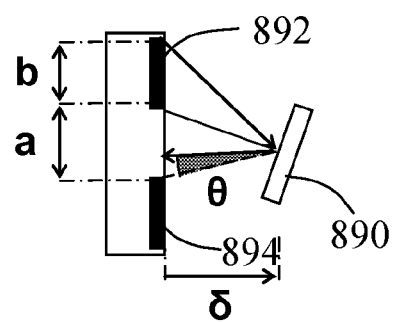

It is noted that in practice the proximity of the reflecting target determines the degree to which the two conditions are met. A proximity angle A may be defined as the angle between the reflection vector and the vector to the end point of the adjacent transceiver unit. As indicated in FIGS. 8E and 8F, the size of the proximity angle A is a function of the distance δ from the reflecting element 890 to the radar array. The proximity angle A may be useful for use as an optimization parameter.

Figure 9A:
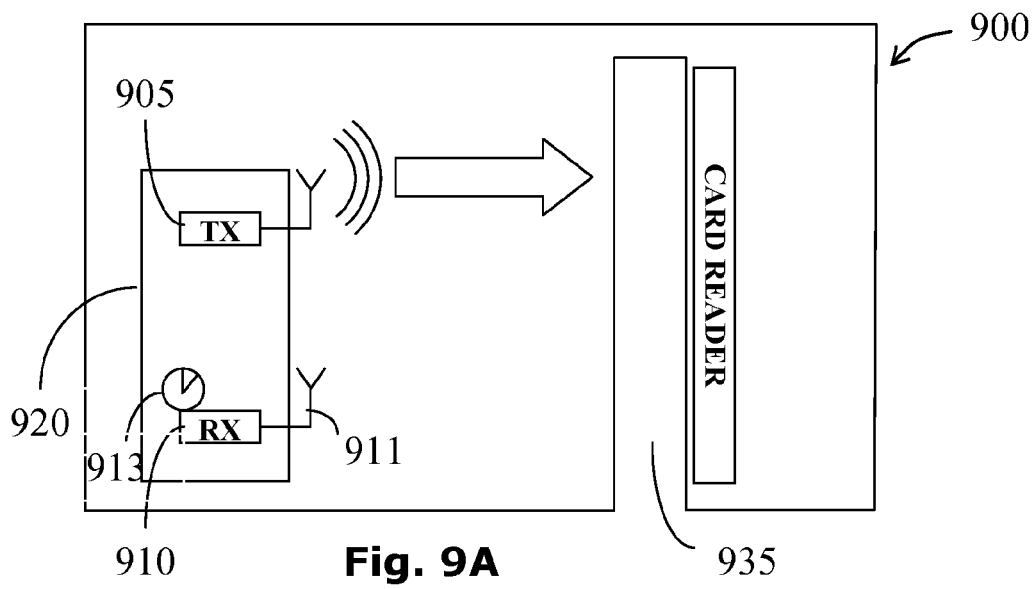
FIGS. 9A and 9B are schematic representations of an embodiment of a system for monitoring the card acceptance slot of a card reader with and without a card introduced in an acceptance slot.

Referring now to FIG. 9A, a schematic representation is shown of an embodiment of a system for monitoring the card acceptance slot of a card reader 900. The system includes a radar chip 920 including a transmitter 905, a receiver 910, a controller and an output mechanism 915.

The transmitter 905 may include an oscillator connected to at least one transmitter antenna or an array of transmitter antennas 906 and configured to produce a directed beam of electromagnetic radiation 907, such as microwave radiation or the like.

The receiver 910 may include at least one receiving antenna or array of receiver antennas 911 configured and operable to receive electromagnetic radiation. Typically a processor is provided to identify reflected radiation received by the receiver which having the characteristic frequency of the transmitted beam. It is a particular feature of the current disclosure that the receiver further includes a timer 913 for timing duration of received signals.

The system is configured and operable to monitor the card acceptance slot of a card reader. Under normal conditions, the card acceptance slot is empty such that the amplitude energy of reflected radiation $A_{Rx}$ is below a detection threshold $A_{th}$.

Figure 9B:
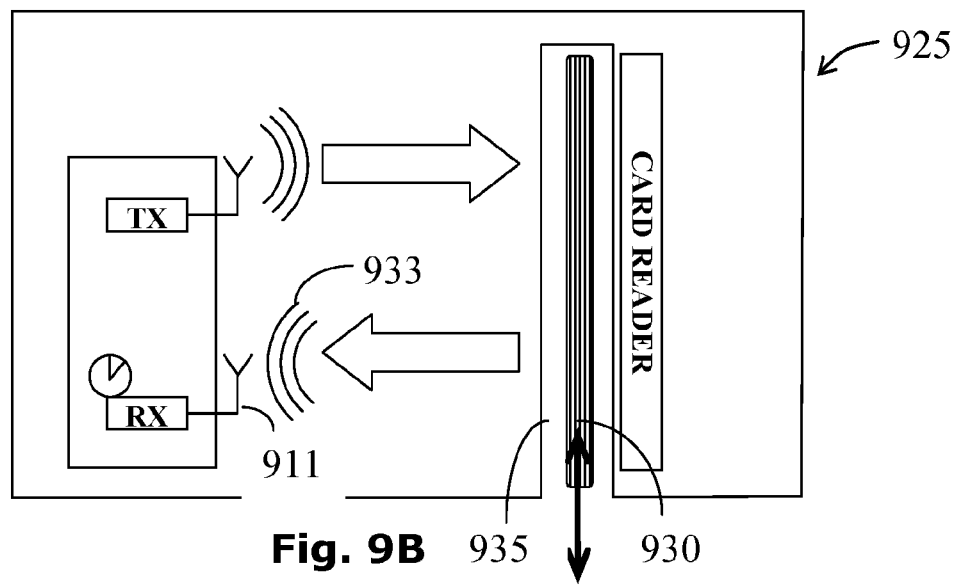

Reference is now made to FIG. 9B (925) schematically representing the monitoring system of FIG. 1A, where a card 930 has been inserted into the acceptance slot 935. It will be appreciated that the introduction of the card 930 into the acceptance slot 935 results in an increase in reflected energy 933. Such an increase may be received by the receiving antenna 911 such that the amplitude energy of reflected radiation $A_{Rx}$ is above the detection threshold $A_{th}$.

Figure 9C:
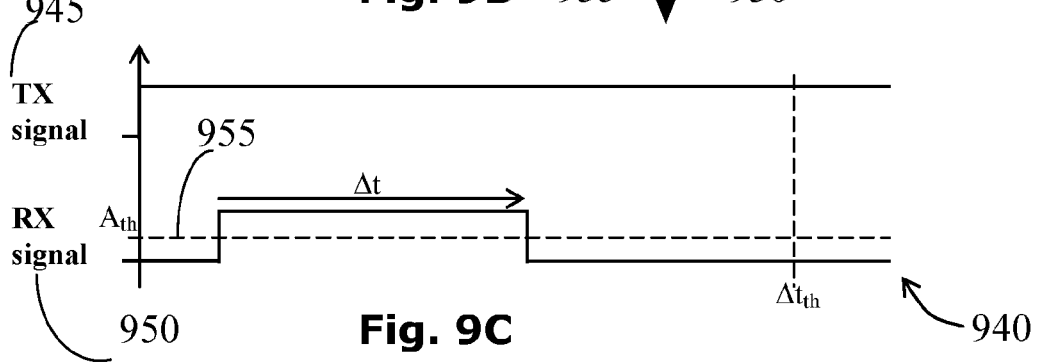
FIG. 9C is a graph indicating the expected received wave signal for the monitoring system during legitimate use where card is introduced into the acceptance slot and removed shortly afterwards.

With reference now to the graphs of FIG. 9C (940) the transmitted signal 945 and the received signal 950 may vary over time as a card is inserted and removed from the card reader during legitimate use.

The transmitted signal 945 remains generally constant while the received signal 950 rises above the detection threshold $A_{th}$ 955 for the detection duration Δt that the card is introduced into the slot. During legitimate use, the received signal 950 drops below the detection threshold $A_{th}$ again shortly after rising.

It is a feature of the system that the timer of the receiver is triggered to start when the received signal 950 rises above the detection threshold $A_{th}$ and to stop when the received signal 950 again drops below the detection threshold $A_{th}$. Accordingly, the detection duration Δt of the high reflected signal 955 may be recorded.

Figure 10A:
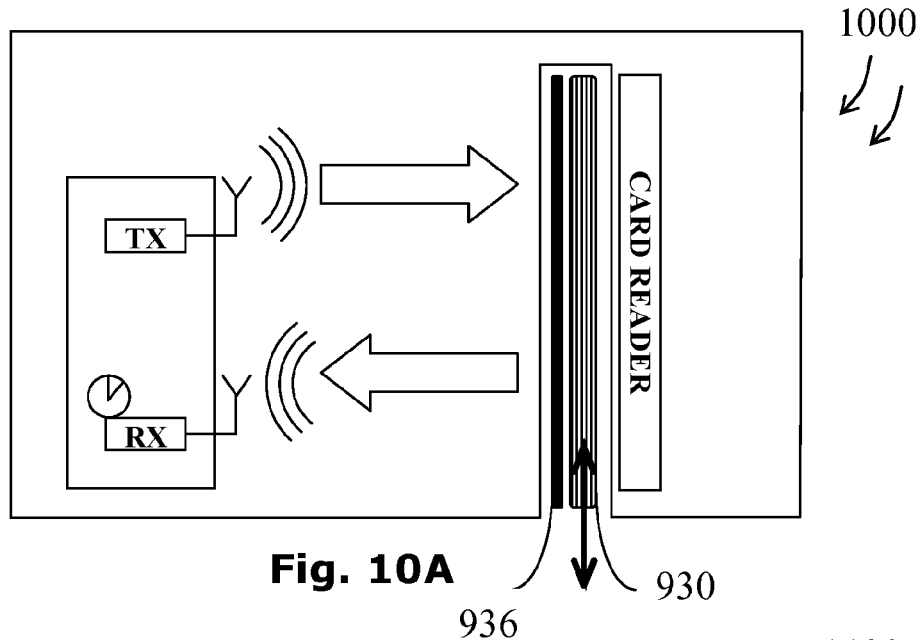
FIGS. 10A and 10B are schematic representations of a compromised card reader where a malicious hardware insert has been introduced into the card acceptance slot with and without a card introduced in an acceptance slot.

Referring now to FIG. 10A, which shows a schematic representation of a compromised card reader 1000, a malicious hardware insert 1010, such as an insert skimmer or the like may be introduced completely into the card acceptance slot 935 such that it is not visible from the outside.

Such an insert may be wafer thin such that it is does not interfere with legitimate cards introduced into the slot but may include power cells, chips, memory elements, cameras, magnetic strip readers, communication chips and all elements required for harvesting, storing and communicating card data.

It is noted that when introduced into the card reader, the malicious hardware insert 1010 may increase the reflected radiation received by the receiver 910 such that it rises above the detection threshold $A_{th}$.

Figure 10B:
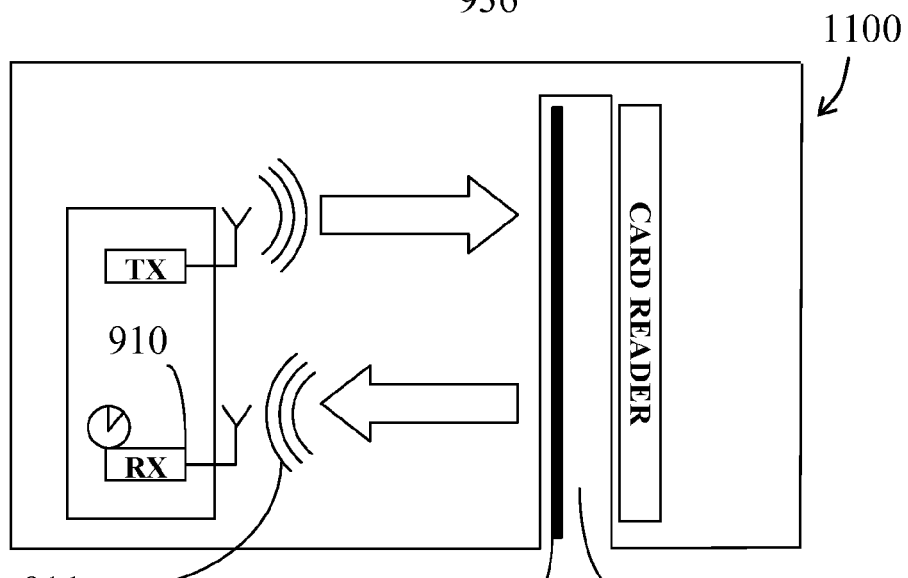
Figure 10C:
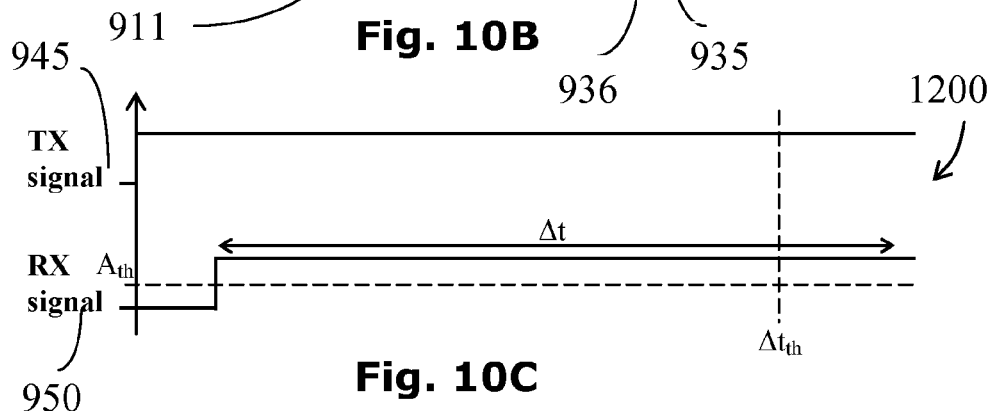
FIG. 10C is a graph indicating the received wave signal for the monitoring system for a compromised card reader.

As schematically shown in FIG. 10B, (1100) even when a legitimate card is removed from the acceptance slot 935 the malicious hardware insert 936 remains within the acceptance slot 935. Accordingly, in a compromised card 930 the reflected radiation received 910 by the receiver 911 of reader may remain high for a prolonged duration.

With reference now to the graphs of FIG. 100 (1200) variation of the transmitted signal 945 and the received signal 950 over time is shown for the compromised card reader.

Again, the transmitted signal 945 remains generally constant and the received signal 950 again rises above the detection threshold $A_{th}$ when the insert 1010 is introduced. However, because of the presence of the insert 1010, it is noted that that the received signal 950 does not drop below the detection threshold $A_{th}$. The extended detection duration Δt may be recorded by the timer of the receiver thereby triggering an alert.

Figure 11:
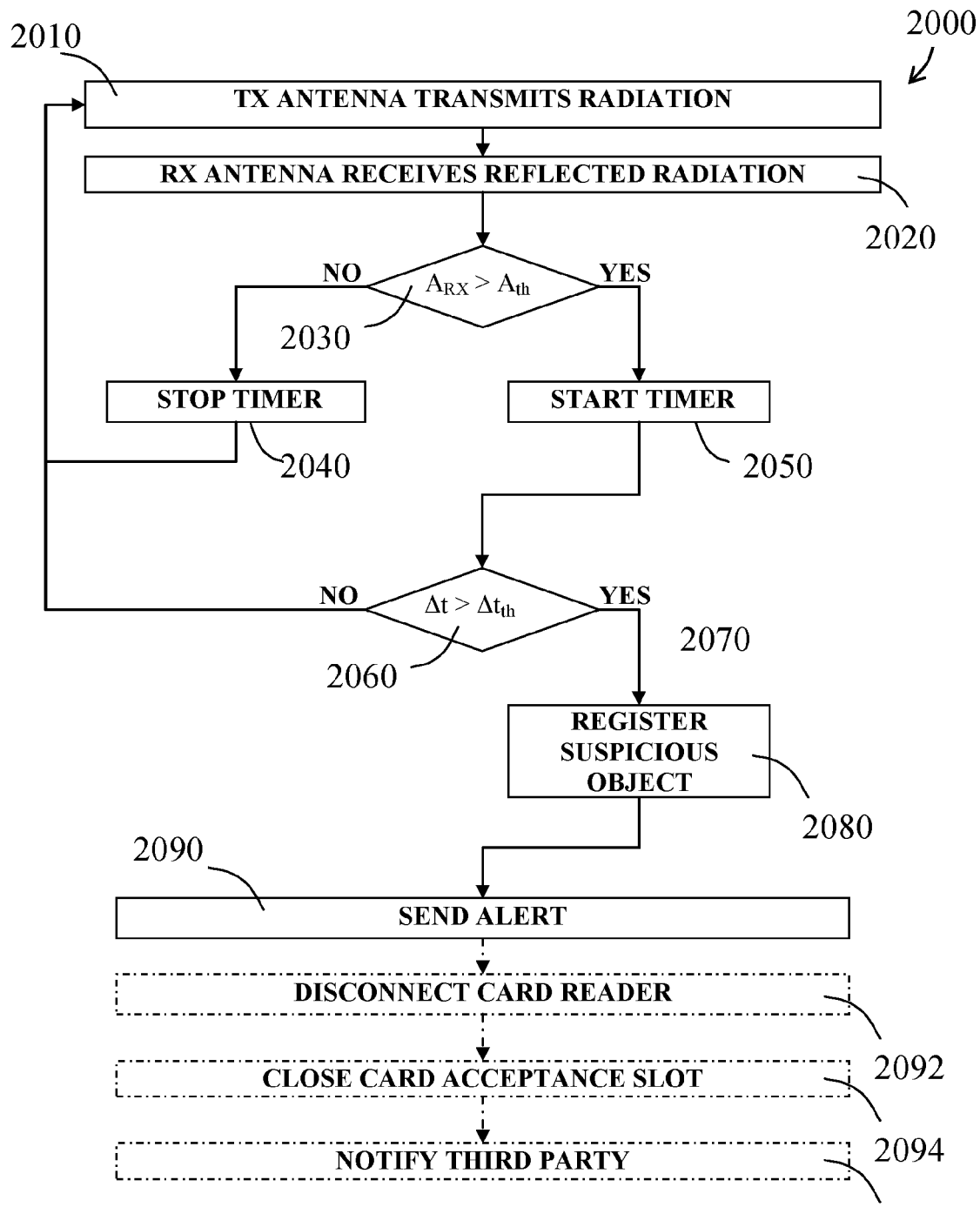
FIG. 11 is a flowchart illustrating a possible method for monitoring card readers.

Reference is now made to the flowchart of FIG. 11 which illustrates a possible method for monitoring card readers 2000.

The transmitter transmits radiation 2010 in the general direction of the card acceptance slot and the receiver receives reflected radiation 2020. The receiver further monitors the amplitude $A_{RX}$ of the energy of the reflected radiation 2030.

A controller or processor may compare the amplitude $A_{RX}$ of the energy of the reflected radiation with the detection threshold $A_{th}$. Where the amplitude $A_{RX}$ of the energy of the reflected radiation is below the detection threshold $A_{th}$, the receiver may reset the timer and the method may repeat the first steps 2040. Where the amplitude $A_{RX}$ of the energy of the reflected radiation is above the detection threshold $A_{th}$, the receiver may start the timer 2050.

The controller or processor may then compare the current detection duration Δt with the duration threshold $Δt_{th}$. Where the current detection duration Δt is shorter than the duration threshold $Δt_{th}$ the system may repeat the first steps 2060. Where the current detection duration Δt exceeds the duration threshold $Δt_{th}$ the system may register a suspicious object detection 2080 event.

The invention may be implemented by an imaging radar, which is capable of inspecting the internal shape of the card reader cavity. Obstruction of parts of the reader by the skimming device incurs a change in the cavity shape as perceived by the radar, producing an alert 2090. Additionally or alternatively the system may further disconnect the card reader 2092, close the card acceptance slot 2094 or notify third parties 2096 as required.

The imaging radar may further classify the shape change versus signature produced by a legitimate card, corresponding to a given shape and composition of a legitimate card, as opposed to the shape and composition of a skimming device. The imaging radar is preferably a MIMO radar. The imaging radar is preferably a broadband radar. Exemplary radio bands suitable for such radar are UWB (ultrawideband, 3-10 GHz), 60 GHz or 80 GHz bands.

In addition to temporal signature of the presence of object in a cavity, the alert can further take into account the presence of a person in front of the card reading machine. For example, person leaving the machine while the object is left in the card reader can indicate that a skimming device is left in the reader. Indication of presence of a person can be obtained by visual, ultrasonic or radar means. In an embodiment, the person detecting device can be an imaging MIMO radar.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A full body scanner comprising:
a scanning arrangement comprising a radar unit having a first array of electromagnetic transceivers and a second array of electromagnetic transceivers, the first array facing the second array; and
a corridor through the scanning arrangement configured to allow a subject to pass through the scanner in an unobstructed path,
wherein said corridor has dimensions selected such that, as the subject passes along the unobstructed path, for any surface-section of the subject, there is a position along the path at which electromagnetic radiation transmitted from at least one transmitter of the scanning arrangement and reflected by the surface-section is received by at least one receiver of the scanning arrangement,
wherein the corridor has a corridor-width dx, the first wall and the second wall share a wall-length dy, and the unobstructed path runs at a path-distance x0 from the first wall; and
wherein the corridor-width dx and the wall-length dy are selected such that $$\frac{1}{2}\left[180 - \arctan\left(\frac{dy}{dx - x_0}\right)\right]$$

is less than or equal to $$\arctan\left(\frac{dy}{x_0}\right),$$

and $$\frac{1}{2}\left[180 - \arctan\left(\frac{dy}{x_0}\right)\right]$$

is greater than or equal to $$180 - \arctan\left(\frac{dy}{dx - x_0}\right).$$

2. The full body scanner of claim 1 wherein:
the corridor is bounded by a first wall and a second wall facing the first wall and parallel thereto; and
the radar unit comprises a first planar array of electromagnetic transceiver units incorporated into the first wall, and a second planar array of electromagnetic transceiver units incorporated into the second wall; and
the unobstructed path follows a straight line parallel to the first wall and the second wall.

3. The full body scanner of claim 1 wherein the transceiver units have a field-of-view of 180-phi; and wherein the path-distance x0 is selected such that:

$$\left[90 - \arctan\left(\frac{dy}{x_0}\right)\right] > phi$$

$$\left[90 - \arctan\left(\frac{dy}{dx - x_0}\right)\right] > phi.$$

4. The full body scanner of claim 1 wherein
the corridor has a corridor-width dx;
the first wall and the second wall share a wall-length dy;
the corridor has a margin of margin-width dw from each wall; and
the unobstructed path runs at a path-distance x0 from the first wall; and
further wherein:
x0 lies within a range dw to (dx-dw).

5. The full body scanner of claim 1 wherein said electromagnetic transceivers comprise at least one phase array transmitter.

6. The full body scanner of claim 5 wherein said electromagnetic transceivers comprise at least one phase array receiver configured perpendicular to the phase array transmitter.

7. The full body scanner of claim 6 further comprising a control chip.

8. The full body scanner of claim 1 wherein said radar unit comprises a plurality of rows of electromagnetic transceivers arranged vertically.

9. The full body scanner of claim 1 wherein said radar unit is encased in at least one of an underfoot unit, a ceiling, a flooring or a combination thereof.

10. The full body scanner of claim 1 wherein said corridor has a curved path.

11. The full body scanner of claim 1 further comprising a display device configured and operable to represent concealed surfaces.

12. A method for performing a full body scan of an individual, the method comprising:
selecting scanning arrangement dimensions such that as a subject passes along an unobstructed path, for any surface-section of the subject, there is a position along the path at which electromagnetic radiation transmitted from at least one transmitter of the scanning arrangement and reflected by the surface-section is received by at least one receiver of the scanning arrangement;
providing a corridor configured to allow the subject to pass along the unobstructed path;

providing a first array of electromagnetic transceivers along one a first side of the corridor;

providing a second array of electromagnetic transceivers along a second side of the corridor facing the second array wherein the corridor has a corridor-width dx, the first side and the second side share a wall-length dy, and the unobstructed path runs at a path-distance x0 from the first side, and wherein the corridor-width dx and the wall-length dy are selected such that:

½[180−arctan(dy/dx−$x_0$)] is less than or equal to arctan (dy/$x_0$), and

½[180−arctan(dy/dx−$x_0$)] is greater than or equal to 180−arctan (dy/dx−$x_0$)

transmitting electromagnetic waves towards subjects passing through the corridor;

receiving electromagnetic waves reflected by subjects passing through the corridor;

transferring raw data to a processor;

generating image data based upon raw data received from the radar unit;

storing the image data in a memory unit; and adjusting a display device to represent the concealed surface on a display.

13. The method of claim 12 wherein the step of generating image data based upon raw data further comprises:

generating an amplitude matrix;

sending the amplitude matrix to a preprocessing unit; and generating a filtered point cloud.

14. The method of claim 13 wherein the step of generating the filtered point cloud further comprises:

removing data below a threshold;

removing outlying data; and downsampling voxels.

15. The method of claim 14 further comprising interpolating for missing data.

16. The method of claim 13 further comprising optimizing point cloud parameters.

17. The method of claim 13 further comprising optimizing point cloud parameters by:

selecting parameters for a candidate model;

comparing filtered point cloud with the candidate model;

adjusting selected parameters;

comparing new filtered point cloud with the candidate model; and repeating the steps of adjusting and comparing until no further significant improvements are made.

18. The method of claim 17 wherein the step of comparing the filtered point cloud with the candidate model comprises:

identifying voxels in the candidate parametric model which are geometrically closest to corresponding points in the point cloud; and calculating Euclidean distance Δ between each of the identified voxels in the candidate parametric model and the corresponding point cloud these points as given by:

$$\Delta = \sqrt{(x-x_m)^2 + (y-y_m)^2 + (z-z_m)^2}$$

where x is an x-coordinate of the point in the point cloud, xm is an x-coordinate of the closest identified voxels in the candidate parametric model, y is a y-coordinate of the point in the point cloud, ym is a y-coordinate of the closest identified voxels in the candidate parametric model, z is a z-coordinate of the point in the point cloud, and zm is a z-coordinate of the closest identified voxels in the candidate parametric model.

19. The method of claim 18 wherein the step of comparing the filtered point cloud with the candidate model further comprises:

summing all the Euclidean distances Δi;

and minimizing the sum ΣΔi.

* * * * *